United States Patent
Ueki

(10) Patent No.: US 9,605,118 B2
(45) Date of Patent: Mar. 28, 2017

(54) FILM AND METHOD FOR MANUFACTURING THE SAME, OPTICAL FILM, POLARIZER-PROTECTING FILM, POLARIZING PLATE, AND IMAGE DISPLAY DEVICE

(71) Applicant: FUJIFILM Corporation, Tokyo (JP)

(72) Inventor: Keigo Ueki, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 42 days.

(21) Appl. No.: 14/327,115

(22) Filed: Jul. 9, 2014

(65) Prior Publication Data

US 2015/0015949 A1    Jan. 15, 2015

(30) Foreign Application Priority Data

Jul. 10, 2013    (JP) ................. 2013-144599

(51) Int. Cl.
*G02B 5/30* (2006.01)
*C08J 5/18* (2006.01)
(Continued)

(52) U.S. Cl.
CPC ............... *C08J 5/18* (2013.01); *B29C 39/14* (2013.01); *B29C 47/0021* (2013.01); *G02B 1/04* (2013.01);
(Continued)

(58) Field of Classification Search
CPC .. C09D 183/08; C09D 171/02; C09D 183/06; C09D 185/00; G02B 1/04; G02B 1/105; G02B 1/111; G02B 5/3083; G02B 5/30; G02B 27/28; C08L 23/18; C08L 2666/04; C08L 2666/14; C08L 83/04; C08L 83/06; C08G 2650/48; C08G 63/193;
(Continued)

(56) References Cited

U.S. PATENT DOCUMENTS

| | | | | |
|---|---|---|---|---|
| 5,484,867 A | * | 1/1996 | Lichtenhan | ............ C08G 77/04 525/474 |
| 2004/0138399 A1 | * | 7/2004 | MacKinnon | ........... C08G 77/04 528/31 |

(Continued)

FOREIGN PATENT DOCUMENTS

| | | |
|---|---|---|
| JP | 2005-213365 A | 8/2005 |
| JP | 2006-111732 A | 4/2006 |

(Continued)

OTHER PUBLICATIONS

Notification of Reasons for Refusal issued by the Japanese Patent Office on Sep. 27, 2016, in connection with Japanese Patent Application No. 2013-144599.

*Primary Examiner* — Bumsuk Won
*Assistant Examiner* — Balram Parbadia
(74) *Attorney, Agent, or Firm* — Jean C. Edwards, Esq.; Edwards Neils LLC

(57) ABSTRACT

A film having a cyclic olefin resin layer including a cyclic olefin resin and a cage-shaped silosesquioxane compound wherein the cage-shaped silosesquioxane compound includes at least one substituent having one or more carbon atoms as a substituent of a Si atom. The film has a cyclic olefin resin layer with a high water vapor barrier property, low haze, and high surface hardness.

17 Claims, 1 Drawing Sheet

(51) Int. Cl.
*G02B 1/04* (2006.01)
*B29C 39/14* (2006.01)
*B29C 47/00* (2006.01)
*B29K 83/00* (2006.01)
*B29L 11/00* (2006.01)
*B29L 7/00* (2006.01)
*B29K 23/00* (2006.01)

(52) U.S. Cl.
CPC ......... *G02B 5/3033* (2013.01); *G02B 5/3083* (2013.01); *B29K 2023/38* (2013.01); *B29K 2083/00* (2013.01); *B29L 2007/008* (2013.01); *B29L 2011/0066* (2013.01); *C08J 2323/08* (2013.01); *C08J 2345/00* (2013.01); *C08J 2365/00* (2013.01); *C08J 2483/04* (2013.01)

(58) Field of Classification Search
CPC .... C08G 64/04; C08G 65/007; C08G 65/329; C08G 77/04; C08G 77/14; C08G 77/38; C08G 77/48; C08G 77/58
See application file for complete search history.

(56) References Cited

U.S. PATENT DOCUMENTS

| | | | |
|---|---|---|---|
| 2004/0186216 A1* | 9/2004 | Satoh | C03C 17/009 524/502 |
| 2005/0112382 A1* | 5/2005 | Allen | C07F 7/21 428/447 |
| 2005/0214556 A1* | 9/2005 | Nishimi | C08K 3/0008 428/500 |
| 2007/0135585 A1* | 6/2007 | Hiraoka | C08F 38/00 525/342 |
| 2007/0184381 A1* | 8/2007 | Muller | G03F 7/0757 430/270.1 |
| 2008/0081022 A1* | 4/2008 | Yu | A61K 8/585 424/43 |
| 2008/0199805 A1* | 8/2008 | Rushkin | G03F 7/0757 430/270.1 |
| 2010/0275561 A1* | 11/2010 | Lundquist | B01D 45/12 55/456 |

FOREIGN PATENT DOCUMENTS

| | | | |
|---|---|---|---|
| JP | 2006111732 A * | 4/2006 | .............. C08L 45/00 |
| JP | 2009-042351 A | 2/2009 | |
| JP | 2010-523771 A | 7/2010 | |
| JP | 2013-006916 A | 1/2013 | |
| WO | 2008/156891 A2 | 12/2008 | |
| WO | 2008/156891 A3 | 12/2008 | |

* cited by examiner

FILM AND METHOD FOR MANUFACTURING THE SAME, OPTICAL FILM, POLARIZER-PROTECTING FILM, POLARIZING PLATE, AND IMAGE DISPLAY DEVICE

CROSS-REFERENCE TO RELATED APPLICATIONS

The present application claims the benefit of priority from Japanese Patent Application No. 2013-144599, filed on Jul. 10, 2013, the contents of which are herein incorporated by reference in their entirety.

BACKGROUND OF THE INVENTION

Field of the Invention

The present invention relates to a film and a method for manufacturing the same, an optical film, a polarizer-protecting film, a polarizing plate, and an image display device. In more detail, the present invention relates to a film including a cyclic olefin resin and a method for manufacturing the film including the cyclic olefin resin, and an optical film, a polarizer-protecting film, a polarizing plate, and an image display device using the film including the cyclic olefin resin.

Description of the Related Art

In the related art, various films have been used as image display device applications such as a polarizer-protecting film of a liquid crystal display device, and films to which various additives are added are known. In recent years, an image display device which can be used in various environments such as an environment of high humidity has been required, and therefore, such a film of image display device applications has been required to have a high water vapor barrier property such that water does not enter the image display device.

It is known that a film of which a raw material is a cyclic olefin resin has a high water vapor barrier property, however, there is a problem in that the film is too soft to be used as a surface film on the viewing side of the image display device and is likely to be scratched, and therefore, it is necessary to improve surface hardness (refer to JP-A-2005-213365). JP-A-2005-213365 describes that there is a method of adding an inorganic material as a means for improving hardness of the film of which a raw material is a cyclic olefin resin, and when mixing an inorganic filler to the extent of sufficiently improving a pencil hardness, there was a problem that optical performance deterioration such as haze occurs. In contrast, in JP-A-2005-213365, the haze-worsening in a film is suppressed and the hardness is improved by highly dispersing layer silicate into a cyclic olefin film by the desired method.

On the other hand, an example in which the hardness of a film is improved by using a cage-shaped silosesquioxane compound (hereinafter, also referred to as POSS) is known (refer to JP-A-2009-042351 and JP-T-2010-523771). In JP-A-2009-042351, POSS is added to a functional layer provided on a base film to increase the hardness of the functional layer, and thereby, the surface hardness of the entire film is improved. Here, POSS is added into an acrylic resin layer or a urethane resin layer, however, POSS is not added to a cyclic olefin resin layer.

Also in JP-T-2010-523771, POSS and the like are added to a base film formed of polypropylene, polyethylene and other noncyclic polyolefin, POSS and the like are moved on the film surface, and thereby, stability against aging, storage life, hydrophobicity, abrasion tolerance, hardness, and friction of the base film are improved, however, POSS is not added to the base film using a cyclic olefin resin as a material, and there is no suggestion regarding application to a cyclic olefin resin.

SUMMARY OF THE INVENTION

However, when the present inventor studied the addition of layer silicate into a cyclic olefin resin layer which is a method described in JP-A-2005-213365, compatibility of the layered silicate and the cyclic olefin was poor, aggregation occurred by simply adding the layer silicate, haze worsened, and hardness remained low.

An object of the present invention is to provide a film having a cyclic olefin resin layer with a high water vapor barrier property, low haze, and high surface hardness.

The present inventors have made extensive studies in order to solve the problems, and as a result, the inventors have found that by forming a film by solution-casting or melt-casting such that a cage-shaped silosesquioxane compound (POSS) having a cyclic olefin resin and an organic group as a substituent is included in the same layer, POSS which contributes to high hardness without the need for special operations while maintaining a high water vapor barrier property of the cyclic olefin resin is dispersed into the cyclic olefin resin film without aggregation, and completed the invention.

Specific means for solving the problems described above are as follows.

[1] A film comprising a cyclic olefin resin layer including a cyclic olefin resin and a cage-shaped silosesquioxane compound, in which the cage-shaped silosesquioxane compound includes at least one substituent having one or more carbon atoms as a substituent of a Si atom.

[2] The film described in [1] preferably includes the cage-shaped silosesquioxane compound of 0.1% by mass to 100% by mass relative to a cyclic olefin.

[3] In the film described in [1] or [2], the cage-shaped silosesquioxane compound preferably has at least one polymerizable reactive group.

[4] In the film described in any of [1] to [3], the cage-shaped silosesquioxane compound preferably has a structure represented by the following formula (1):

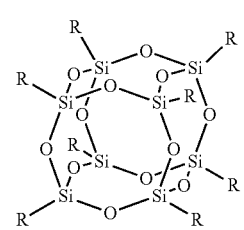

Formula (1)

(In the formula (1), each R independently represents a hydrogen atom or a substituent, and at least one R represents a substituent having one or more carbon atoms.

[5] In the film described in [4], in the formula (1), each R preferably independently represents a substituent having one or more carbon atoms.

[6] In the film described in [4] or [5], in the formula (1), R preferably includes an alkyl group, an alkenyl group, an alkynyl group, an aryl group, or a siloxy group (here, these groups may further have an alkyl group, an alkenyl group, an alkynyl group, an aryl group, a halogen atom, or a polymerizable reactive group as a substituent.)

[7] In the film described in any of [4] to [6], wherein 1 to 3 polymerizable reactive groups which are independent from each other and 5 to 7 groups selected independently from alkyl group, alkenyl group, alkynyl group, aryl group, or a siloxy group in which these groups may further have an alkyl group, an alkenyl group, an alkynyl group, an aryl group, a halogen atom, or a polymerizable reactive group as a substituent exist as R in the formula (1).

[8] The film described in any of [1] to [7] preferably comprises a hard coat layer on at least one surface of the cyclic olefin resin layer.

[9] In the film described in any of [1] to [8], pencil hardness measured by a method equivalent to JIS K 5400 is preferably 2B or harder.

[10] In the film described in any of [1] to [9], haze is preferably 3% or less.

[11] In the film described in any of [1] to [10], a thickness is preferably 20 μm to 100 μm.

[12] A method for manufacturing a film including obtaining a melt by melting a composition containing a cyclic olefin resin and a cage-shaped silosesquioxane compound; and forming a cyclic olefin resin layer by extruding the melt in a film shape, in which the cage-shaped silosesquioxane compound includes at least one substituent having one or more carbon atoms as a substituent of a Si atom.

[13] In the method for manufacturing the film described in [12], a temperature of the melt in the melting step is preferably 120° C. to 180° C.

[14] A method for manufacturing a film including solution-casting a dope containing a cyclic olefin resin, a cage-shaped silosesquioxane compound, and a solvent on a support; drying the dope after casting; and forming a cyclic olefin resin layer by stripping the dope from the support, in which the cage-shaped silosesquioxane compound includes at least one substituent having one or more carbon atoms as a substituent of a Si atom.

[15] A film manufactured by the method for manufacturing the film described in any of [12] to [14].

[16] An optical film including the film described in any of [1] to [11] and [15].

[17] A polarizer-protecting film including the film described in any of [1] to [11] and [15] or the optical film described in [16].

[18] A polarizing plate including a polarizer, the film described in any of [1] to [11] and [15], the optical film described in [16], or the polarizer-protecting film described in [17].

[19] An image display device including the film described in any of [1] to [11] and [15], the optical film described in [16], the polarizer-protecting film described in [17], or the polarizing plate described in [18].

According to the present invention, a film having a cyclic olefin resin layer with a high water vapor barrier property, low haze, and high surface hardness can be provided.

DETAILED DESCRIPTION OF THE INVENTION

Figure 1:
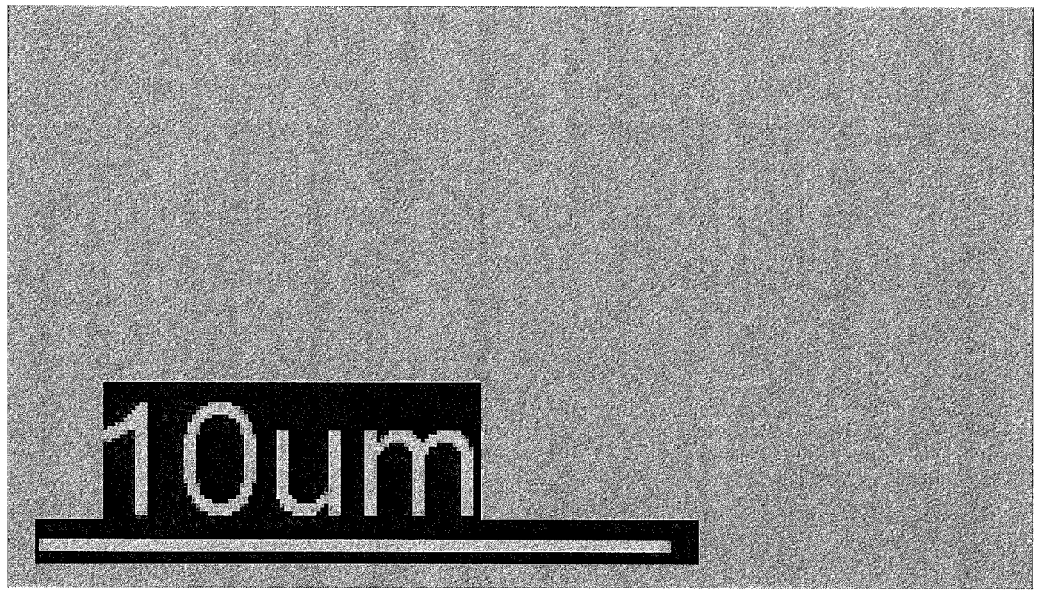
FIG. 1 is a 100 times magnified image of a film in the example 3 using an optical microscope.

Hereinafter, content of the present invention will be described in detail. The description of the constituent components described below is sometimes given based on representative embodiments of the present invention, however, the present invention is not limited to such embodiments. Furthermore, in the specification, "~ to ~" means the ranges including the numerical values described before and after the "~ to ~" as the upper limit value and the lower limit value.

Film

The film of the present invention comprises a cyclic olefin resin layer including a cyclic olefin resin and a cage-shaped silosesquioxane compound, and the cage-shaped silosesquioxane compound includes at least one substituent having one or more carbon atoms as a substituent of a Si atom.

With this constitution, a film having a cyclic olefin resin layer with a high water vapor barrier property, low haze, and high surface hardness can be provided. Here, the cage-shaped silosesquioxane compound (POSS) used in the present invention has a cage-shaped inorganic portion having a —Si—O— bond and at least one substituent having one or more carbon atoms as a substituent of a Si atom. It is considered that in the cage-shaped silosesquioxane compound with such a structure, hardness in the inorganic portion is improved and compatibility with the cyclic olefin resin in the organic portion is obtained. In the related art, the layer silicate used in JP-A-2005-213365 or the like to increase the hardness of a film needs a high dispersion process, however, by simply adding to the cyclic olefin resin, the POSS can be uniformly dispersed into a film (into a cyclic olefin resin layer) without aggregation. Thus, the hardness of the film can be efficiently improved without aggravating the haze of the film.

Hereinafter, a preferable aspect of the film of the present invention will be sequentially described.

Cyclic Olefin Resin

In the film of the present invention, the cyclic olefin resin layer includes a cyclic olefin resin.

As the cyclic olefin resin, which is not particularly limited, a known cyclic olefin resin can be used. Compound having a cyclic aliphatic hydrocarbon group and an unsaturated double bond group in a molecule A compound having a cyclic aliphatic hydrocarbon group and an unsaturated double bond group in a molecule functions as a binder. In addition, the compound having a cyclic aliphatic hydrocarbon group and an unsaturated double bond group can function as a curing agent, and it is possible to improve strength and abrasion resistance of a coating film, and to impart low moisture permeability at the same time.

By using such a compound, it is possible to realize low moisture permeability and high film strength. Details are not clear, however, it is thought that by using a compound having a cyclic aliphatic hydrocarbon group in a molecule, a hydrophobic cyclic aliphatic hydrocarbon group is introduced into a low moisture-permeable layer, and the layer is hydrophobized, and therefore, incorporation of molecules from the outside is prevented, and the moisture permeability is lowered. In addition, by having an unsaturated double bond group in the molecule, a crosslinking point density is increased and a diffusion path of a water molecule in the low moisture-permeable layer is limited. It is considered that by increasing the crosslinking point density, the density of the cyclic aliphatic hydrocarbon group relatively increases, the inside of the low moisture-permeable layer becomes more hydrophobic, the adsorption of water molecules is prevented, and the moisture permeability is decreased.

The number of the unsaturated double bond group contained in a molecule to increase the crosslinking point density is more preferably 2 or more.

The cyclic aliphatic hydrocarbon group is preferably a group derived from an alicyclic compound having 7 or more carbon atoms, more preferably a group derived from an alicyclic compound having 10 or more carbon atoms, and still more preferably a group derived from an alicyclic compound having 12 or more carbon atoms.

The cyclic aliphatic hydrocarbon group is particularly preferably a group derived from a polycyclic compound such as a bicyclic compound and a tricyclic compound.

A central skeleton of the compounds stated in a claim of JP-A-2006-215096, a central skeleton of the compounds stated in JP-A-2001-10999, or a skeleton of adamantane derivatives is more preferable.

The cyclic aliphatic hydrocarbon group (including a linking group) is preferably a group represented by any of the following formula (I) to (V), more preferably a group represented by the following formula (I), (II), or (IV), and still more preferably a group represented by the following formula (I).

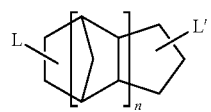
(I)

In the formula (I), each of L and L' independently represents a divalent or higher linking group, and both L and L' are not divalent at the same time. n represents an integer of 1 to 3.

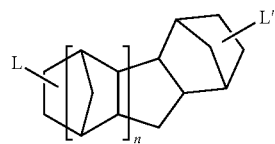
(II)

In the formula (II), each of L and L' independently represents a divalent or higher linking group, and both L and L' are not divalent at the same time. n represents an integer of 1 to 2.

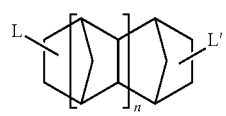
(III)

In the formula (III), each of L and L' independently represents a divalent or higher linking group, and both L and L' are not divalent at the same time. n represents an integer of 1 to 2.

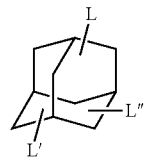
(IV)

In the formula (IV), each of L and L' independently represents a divalent or higher linking group, and L" represents a hydrogen atom or a divalent or higher linking group.

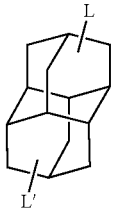
(V)

In the formula (V), each of L and L' independently represents a divalent or higher linking group, and both L and L' are not divalent at the same time.

Specific examples of the cyclic aliphatic hydrocarbon group include norbornyl, tricyclodecanyl, tetracyclododecanyl, pentacyclopentadecanyl, adamantyl, and diamantanyl.

Examples of the unsaturated double bond group include a polymerizable functional group such as a (meth)acryloyl group, a vinyl group, a styryl group, and an allyl group, and among these, a (meth)acryloyl group and a —C(=O)OCH=CH$_2$ group are preferable. Particularly preferably, a compound containing three or more (meth)acryloyl groups in one molecule described below can be used.

A compound having the cyclic aliphatic hydrocarbon group and three or more unsaturated double bonds in a molecule is constituted by bonding of the cyclic aliphatic hydrocarbon group and the group having an unsaturated double bond through a linking group.

Examples of the linking group include a single bond, an alkylene group having 1 to 6 carbon atoms which may be substituted, an amide group of which an N-position may be substituted, a carbamoyl group of which an N-position may be substituted, an ester group, an oxycarbonyl group, an ether group, and groups obtained by combining these.

For example, these compounds can be easily synthesized by a one step or two step reaction of polyol such as diol and triol having the cyclic aliphatic hydrocarbon group and carboxylic acid of a compound having a (meth)acryloyl group, a vinyl group, a styryl group, or an allyl group, a carboxylic acid derivative, an epoxy derivative, or an isocyanate derivative.

Preferably, these compounds can be synthesized by reacting a compound such as (meth)acrylic acid, (meth)acryloyl chloride, (meth)acrylic anhydride, and glycidyl(meth)acrylate, or a compound described in WO2012/00316A (for example, 1,1-bis(acryloxymethyl)ethylisocyanate) with polyol having the cyclic aliphatic hydrocarbon group.

Specific examples of the compound having the cyclic aliphatic hydrocarbon group and the unsaturated double bond group will be shown below, but the present invention is not limited thereto.

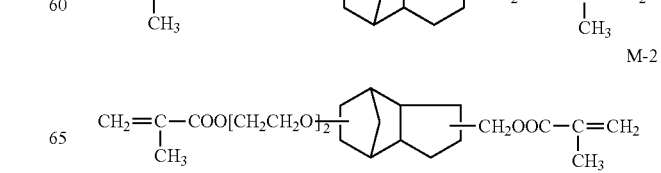

M-1

M-2

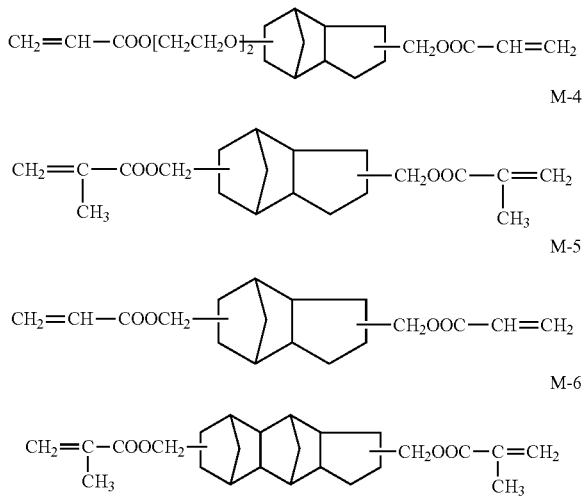

Other Cyclic Olefin Resins

Examples of other cyclic olefin resins capable of being used in the present invention include (1) norbornene-based polymers, (2) polymers of monocyclic olefin, (3) polymers of cyclic conjugated diene, (4) vinyl alicyclic hydrocarbon polymers, and hydrides of (1) to (4).

The cyclic olefin resin preferable in the present invention is an addition (co)polymer cyclic olefin-based resin including at least one or more repeating units represented by the following formula (102) and, an addition (co)polymer cyclic olefin-based resin further including at least one or more repeating units represented by the following formula (101), if necessary. In addition, a ring-opened (co)polymer including at least one repeating unit represented by the formula (103) can also be suitably used.

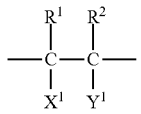

Formula (101)

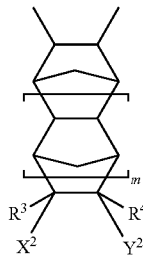

Formula (102)

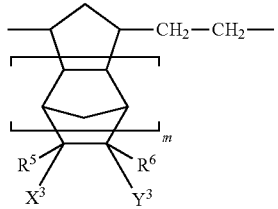

Formula (103)

In the formulas (101) to (103), m represents an integer 0 to 4. $R^1$ to $R^6$ represent a hydrogen atom or a hydrocarbon group having 1 to 10 carbon atoms, $X^1$ to $X^3$ and $Y^1$ to $Y^3$ represent a hydrogen atom, a hydrocarbon group having 1 to 10 carbon atoms, a halogen atom, a hydrocarbon group having 1 to 10 carbon atoms substituted with a halogen atom, $-(CH_2)_nCOOR^{11}$, $-(CH_2)_nOCOR^{12}$, $-(CH_2)_nNCO$, $-(CH_2)_nNO_2$, $-(CH_2)_nCN$, $-(CH_2)_nCONR^{13}R^{14}$, $-(CH_2)_nNR^{13}R^{14}$, $-(CH_2)_nOZ$, $-(CH_2)_nW$, or $(-CO)_2O$, $(-CO)_2NR^{15}$ constituted with $X^1$ and $Y^1$, $X^2$ and $Y^2$, or $X^3$ and $Y^3$. Moreover, $R^{11}$, $R^{12}$, $R^{13}$, $R^{14}$, and $R^{15}$ represent a hydrogen atom or a hydrocarbon group having 1 to 20 carbon atoms, Z represents a hydrocarbon group or a hydrocarbon group substituted with a halogen atom, W represents $SiR^{16}{}_pD_{3-p}$ ($R^{16}$ represents a hydrocarbon group having 1 to 10 carbon atoms, D represents a halogen atom, $-OCOR^{16}$, or $OR^{16}$, p represents an integer of 0 to 3), and n represents an integer of 0 to 10.

As disclosed in JP-A-1-240517, JP-A-7-196736, JP-A-60-26024, JP-A-62-19801, JP-A-2003-1159767, or JP-A-2004-309979, norbornene-based polymer hydride is prepared by hydrogenating after addition polymerization or metathesis ring-opening polymerization of a polycyclic unsaturated compound. In the norbornene-based polymer used in the present invention, $R^5$ and $R^6$ are preferably a hydrogen atom or $CH_3$, $X^3$ and $Y^3$ are preferably a hydrogen atom, Cl, $-COOCH_3$, and other groups may be suitably selected. The norbornene-based resins sold under the trade name of Arton G (for example, ARTON G7810 and the like) or Arton F from JSR Corporation, or commercially available under the trade name of Zeonor ZF14, ZF16, Zeonex 250, or 280 from ZEON CORPORATION can be used.

The norbornene-based addition (co)polymer is disclosed in JP-A-10-7732, JP-T-2002-504184, U.S. Patent No. 2004229157A1, or WO2004/070463A1. The norbornene-based addition (co)polymer is obtained by mutual addition polymerization of norbornene-based polycyclic unsaturated compounds. In addition, the norbornene-based addition (co)polymer is obtained by addition polymerization of a norbornene-based polycyclic unsaturated compound and ethylene, propylene, butene; conjugated diene such as butadiene and isoprene; nonconjugated diene such as ethylidene norbornene; or a linear dien compound such as acrylonitrile, acrylic acid, methacrylic acid, maleic anhydride, acrylic ester, methacrylic ester, maleimide, vinyl acetate, and vinyl chloride, if necessary. The norbornene-based addition (co)polymer is sold under the trade name APEL by Mitsui Chemicals, Inc., and for example, there are grades such as APL8008T (Tg 70° C.), APL6013T (Tg 125° C.), and APL6015T (Tg 145° C.) which have different glass transition temperatures (Tg). Pellets such as TOPAS 8007, 6013, and 6015 are sold by Polyplastic Co., Ltd. In addition, Appear 3000 are sold by Ferrania Technologies.

In the present invention, the glass transition temperature (Tg) of the cyclic olefin-based resin is not limited, and for example, the cyclic olefin-based resin having a high Tg of 200° C. to 400° C. can also be used.

A weight average molecular weight of the cyclic olefin resin is preferably within a range of 1,000 to 2,000,000, more preferably within a range of 5,000 to 1,000,000, still more preferably within a range of 10,000 to 500,000, and particularly preferably within a range of 50,000 to 500,000.

Commercially available products may be used as the cyclic olefin resin. In addition, the cyclic olefin resin may be obtained by synthesis, and for example, the cyclic olefin resin can be synthesized by referencing JP-A-2009-42782 or JP-A-2009-138129.

Cage-Shaped Silosesquioxane Compound

In the film of the present invention, the cyclic olefin resin layer includes a cage-shaped silosesquioxane compound, and the cage-shaped silosesquioxane compound includes at least one substituent having one or more carbon atoms as a substituent of a Si atom.

Here, silsesquioxane is also referred to as a T resin. Whereas common silica is represented by the formula [$SiO_2$], silsesquioxane (also referred to as polysilsesquioxane) is a compound represented by the formula [$RSiO_{1.5}$] (R and R' represent a hydrogen atom or a substituent in this paragraph), and in general, is polysiloxane synthesized by hydrolysis and polycondensation of a ($RSi(OR')_3$) compound in which one alkoxy group in tetraalkoxysilane ($Si(OR')_4$) represented by tetraethoxysilane is substituted with a substituent such as an alkyl group or an aryl group. As the shape of molecular arrangement thereof, an amorphous shape, a ladder shape, and a cage shape (complete condensation cage shape) are typically, and in the present invention, a cage-shaped silosesquioxane compound is used.

As the cage-shaped silosesquioxane compound used in the present invention, specifically, a type represented by the chemical formula [$RSiO_{1.5}$]$_8$ (R represents a hydrogen atom or a substituent in this paragraph), a type represented by the chemical formula [$RSiO_{1.5}$]$_{10}$, a type represented by the chemical formula [$RSiO_{1.5}$]$_{12}$, a type represented by the chemical formula [$RSiO_{1.5}$]$_{14}$, and a type represented by the chemical formula [$RSiO_{1.5}$]$_{16}$ among compounds represented by the formula (I) described below are known.

Among these, when used in the present invention, a compound most preferable from the viewpoint of obtaining the effects of the present invention is a compound (also referred to as T8-silsesquioxane) having a cubic structure represented by the chemical formula [$RSiO_{1.5}$]$_8$ among compounds represented by the formula (1) described below.

More specifically, the detailed explanation thereof is described in "Polymer Journal, Vol. 47, December (1998), p. 899" or p. 351 of "Special silicon reagent, 7th edition (published in Nov. 3, 1998)" which is a catalog published by Chisso Corporation/Azmax Corporation.

The cage-shaped silosesquioxane compound includes at least one substituent having one or more carbon atoms as a substituent of a Si atom. The cage-shaped silosesquioxane compound may include at least one substituent having one or more carbon atoms as a substituent of a Si atom, and even if other Si atoms are not substituted (bonded with hydrogen atoms), the cage-shaped silosesquioxane compound may have a substituent not including a carbon atom. Among these, the cage-shaped silosesquioxane compound is preferably a compound in which substituents of the entire Si atoms are substituents having one or more carbon atoms.

Examples of the substituent of Si atom which is a substituent having one or more carbon atoms include an alkyl group, an alkenyl group, an alkynyl group, an aryl group, a siloxy group (here, these groups may further have an alkyl group, an alkenyl group, an alkynyl group, an aryl group, a halogen atom, or a polymerizable reactive group as a substituent), and a polymerizable reactive group described below.

First, the polymerizable reactive group will be described, and the preferable range of other respective substituents will be mentioned in the description of the formula (1) described below.

In the film of the present invention, it is preferable that the cage-shaped silosesquioxane compound described above have at least one group including a polymerizable reactive group from the viewpoint of further improving the hardness by polycondensation reaction of the cage-shaped silosesquioxane compound. In particular, when manufacturing the film using the cage-shaped silosesquioxane compound having a group including the polymerizable reactive group, it is preferable for the polymerizable reactive group to cause a polymerization reaction in a process of drying after casting.

As an aspect in which a group including the polymerizable reactive group described above substitutes for a Si atom, an aspect in which the polymerizable reactive group substitutes for a Si atom through a linking group and an aspect in which only the polymerizable reactive group substitutes for a Si atom can be exemplified, and the aspect in which the polymerizable reactive group substitutes for a Si atom through a linking group is preferable. That is, the group including the polymerizable reactive group is preferably a group obtained by combination of the polymerizable reactive group and the linking group.

Examples of the polymerizable reactive group, which is not particularly limited, include a vinyl group, an allyl group, an acryloyl group, a methacryloyl group, a norbornenyl group, and a mercapto group, and among these, an acryloyl group, a methacryloyl group, and norbornenyl group are preferable, a methacryloyl group and a norbornenyl group are more preferable, and a norbornenyl group is particularly preferable.

As the linking group, which is not particularly limited, a linking group derived from an alkyl group, a linking group derived from an alkenyl group, a linking group derived from an alkynyl group, a linking group derived from an aryl group, or a linking group derived from a siloxy group is preferable, a linking group derived from an alkyl group or a linking group derived from a siloxy group is more preferable, and a linking group derived from an alkyl group is particularly preferable. The preferable range of each group capable of forming the linking group is the same as the preferable range of an alkyl group, an alkenyl group, an alkynyl group, an aryl group, or a siloxy group which is represented by R in the formula (1) described below.

In the film of the present invention, the cage-shaped silosesquioxane compound preferably has a structure represented by the following formula (1).

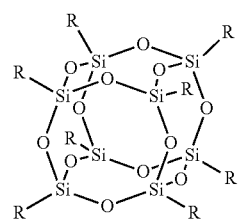

Formula (1)

In the formula (1), each R independently represents a hydrogen atom or a substituent, and at least one R represents a substituent having one or more carbon atoms.

In the film of the present invention, in the formula (1), each of 4 to 8R preferably independently represents a substituent having one or more carbon atoms, each of 6 to 8R more preferably independently represents a substituent having one or more carbon atoms, each of 7 or 8R particularly preferably independently represents a substituent having one or more carbon atoms, and each of the entire R more particularly preferably independently represents a substituent having one or more carbon atoms.

In the film of the present invention, in the formula (1), R preferably includes an alkyl group, an alkenyl group, an alkynyl group, an aryl group, or a siloxy group. Here, these groups may further have substituents, and as the substituents, an alkyl group, an alkenyl group, an alkynyl group, an aryl group, a halogen atom, or a polymerizable reactive group is preferable.

Among these, in the formula (1), R preferably includes a linear, branched, or cyclic alkyl group from the viewpoint of increasing compatibility with the cyclic olefin and reducing haze of a film.

The alkyl group which is represented by R in the formula (1) may be a linear alkyl group, a branched alkyl group, or a cyclic alkyl group, and may be further substituted with a substituent. In a case where the alkyl group which is represented by R in the formula (1) is not substituted, a branched or cyclic alkyl group is preferable, and a branched alkyl group is more preferable. In a case where the alkyl group which is represented by R in the formula (1) has a substituent, a linear alkyl group is preferable.

Examples of the substituent which the alkyl group which is represented by R in the formula (1) may have, include an alkenyl group (the preferable range is the same range as in the alkenyl group which is represented by R in the formula (1)), an alkynyl group (the preferable range is the same range as in the alkynyl group which is represented by R in the formula (1)), an aryl group (the preferable range is the same range as in the aryl group which is represented by R in the formula (1)), a halogen atom (a fluorine atom and a chlorine atom are preferable, and a fluorine atom is more preferable), and the above-described polymerizable reactive group. Among these, the alkenyl group, the halogen atom, and the above-described polymerizable reactive group are preferable.

As the alkyl group which is represented by R in the formula (1), an alkyl group having 1 to 20 carbon atoms is preferable, an alkyl group having 1 to 8 carbon atoms is more preferable, and an alkyl group having 2 to 6 carbon atoms is particularly preferable.

Specific examples of the alkyl group which is represented by R in the formula (1) include a methyl group, an ethyl group, a cyclopentyl group, a cyclohexyl group, an n-propyl group, an isopropyl group, a 2-ethylhexyl group, an isobutyl group, a tert-butyl group, an isooctyl group, a 2-chloroethyl group, a methacryloxymethyl group, a methacryloxypropyl group, a norbornenylmethyl group, a norbornenylethyl group, an allyl group, a 3,3,3-trifluoropropyl group, a 3-aminopropyl group, a 3-mercaptopropyl group, and a 3-glycidoxypropyl group.

The alkenyl group which is represented by R in the formula (1) may be a linear alkenyl group, a branched alkenyl group, and may be further substituted with a substituent.

As the alkenyl group which is represented by R in the formula (1), an alkenyl group having 2 to 20 carbon atoms is preferable, an alkenyl group having 2 to 4 carbon atoms is more preferable, and an alkenyl group having 2 or 3 carbon atoms is particularly preferable.

Specific examples of the alkenyl group which is represented by R in the formula (1) include a vinyl group, a 1-cyclohexenyl group, and a 2,2-dimethylvinyl group.

The alkynyl group which is represented by R in the formula (1) is not particularly limited, and may be further substituted with a substituent.

As the alkynyl group which is represented by R in the formula (1), an alkynyl group having 2 to 20 carbon atoms is preferable, an alkynyl group having 2 to 4 carbon atoms is more preferable, and an alkynyl group having 2 or 3 carbon atoms is particularly preferable.

The aryl group which is represented by R in the formula (1) may be a 6π system or a 10π system, and may be further substituted with a substituent.

As the aryl group which is represented by R in the formula (1), an aryl group having 6 to 20 carbon atoms is preferable, an aryl group having 6 to 10 carbon atoms is more preferable, and a phenyl group is particularly preferable.

Specific examples of the aryl group which is represented by R in the formula (1) include a phenyl group, a 1-naphthyl group, a 2-naphthyl group, and a phenanthryl group.

The siloxy group which is represented by R in the formula (1) is not particularly limited, and may be preferably further substituted with a substituent. As the substituent, an alkyl group is preferable, an alkyl group having 1 to 3 carbon atoms is more preferable, and a methyl group is particularly preferable.

Specific examples of the siloxy group which is represented by R in the formula (1) include a trimethylsiloxy group and a dimethylnorbornenylmethylsiloxy group.

In the film of the present invention, in the formula (1), R preferably includes a group selected from a group including each independent 1 to 3 polymerizable reactive group, each independent 5 to 7 alkyl group, alkenyl group, alkynyl group, aryl group, or a siloxy group (here, these groups may further have an alkyl group, an alkenyl group, an alkynyl group, an aryl group, a halogen atom, or a polymerizable reactive group as a substituent).

The number of groups including the polymerizable reactive group included in the formula (1) is more preferably one or two, and particularly preferably one.

The number of groups selected from an alkyl group, an alkenyl group, an alkynyl group, an aryl group, or a siloxy group (here, these groups may further have an alkyl group, an alkenyl group, an alkynyl group, an aryl group, a halogen atom, or a polymerizable reactive group as a substituent) included in the formula (1) is more preferably 6 or 7, particularly preferably 7.

As long as the effect of the present invention is not diminished, in the formula (1), R may include a substituent having polarity (an acryloyl group, a methacryloyl group, and a group including a polyalkoxy structure) other than an alkyl group, an alkenyl group, an alkynyl group, an aryl group, or a siloxy group. The range of preferable number of a substituent having polarity included in the formula (1) is also the same as the range of preferable number of R which is polymerizable reactive group included in the formula (1).

Here, as the substituent having polarity, substituents having a relatively small polarity such as an acryloyl group and a methacryloyl group are more preferable than groups having high polarity such as a hydroxyl group, a sulfonyl group, and a group including a polyalkoxy structure having a large number of polyalkoxy repeating units from the viewpoint that the substituents having relatively small polarity improve the compatibility with the cyclic olefin resin, and thus the haze of a film can be reduced, and the substituents having relatively small polarity do not adversely affect the water vapor barrier property of the film.

Hereinafter, preferable examples of the cage-shaped silosesquioxane compound which can be preferably used in the present invention will be shown below, and the present invention is not limited to these specific examples.

(POSS1)

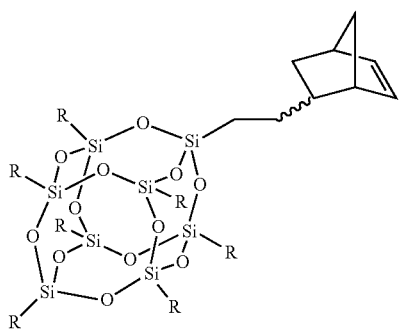

Norbornenylethyl heptaisobutyl POSS
R = i-butyl (POSS2)

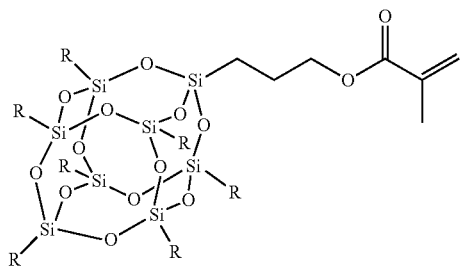

Methacryloyl propyl heptaisobutyl POSS
R = i-butyl (POSS3)

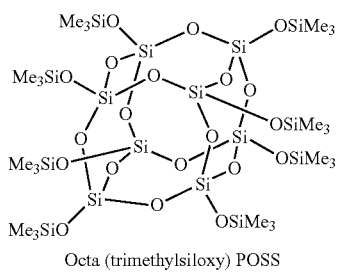

Octa (trimethylsiloxy) POSS (POSS4)

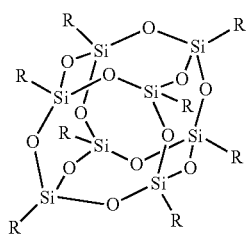

Octamethyl POSS
R = methyl (POSS5)

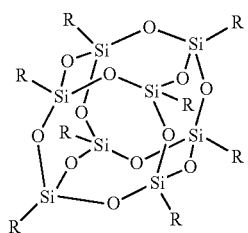

Octaisobutyl POSS
R = i-butyl (POSS6)

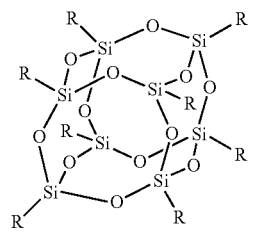

Octaphenyl POSS
R = phenyl (POSS7)

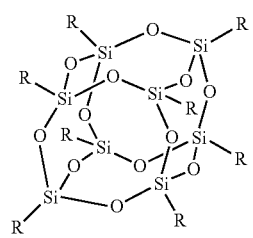

Octaisooctyl POSS
R = i-octyl (POSS8)

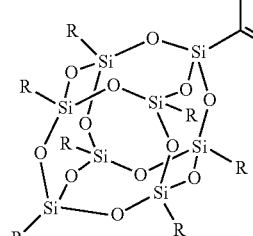

Phenyl heptaisobutyl POSS
R = i-butyl (POSS9)

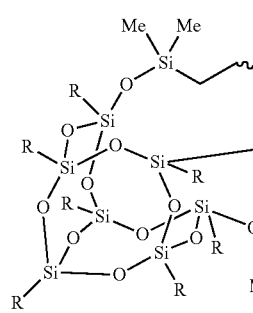

Trinorbornenyl heptaisobutyl POSS
R = i-butyl (POSS10)

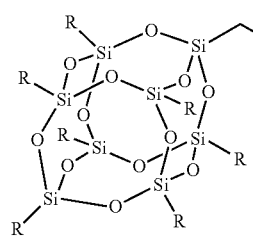

Allyl heptaisobutyl POSS
R = i-butyl (POSS11)

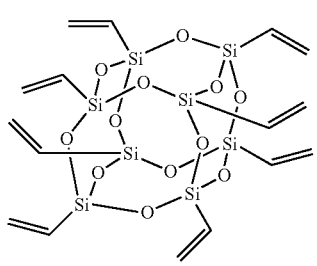

Octavinyl POSS (POSS12)

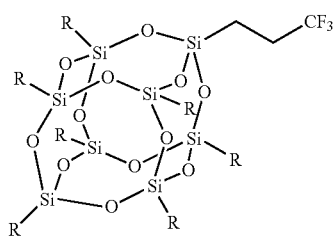

Trifluoropropyl heptaisobutyl POSS
R = i-butyl (POSS13)

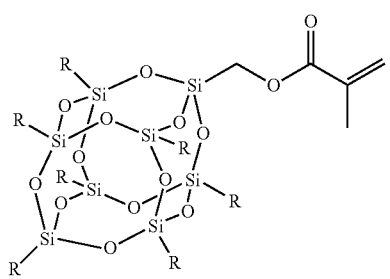

Methacryloyl methylheptacyclohexyl POSS
R = cyclohexyl (POSS14)

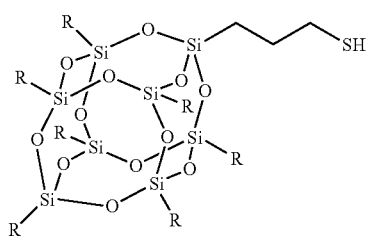

Mercaptopropyl heptaisobutyl POSS
R = i-butyl

As the cage-shaped silosesquioxane compound, commercially available products may be used. For example, as the cage-shaped silosesquioxane compound having the structure described in the above specific example, commercially available products manufactured by Hybrid Plastics can be preferably used.

In addition, the cage-shaped silosesquioxane compound may be obtained by synthesis.

The cage-shaped silosesquioxane compound is preferably synthesized by hydrolysis and polycondensation of the corresponding $(RSi(OR')_3)$ compound (R and R' represent a hydrogen atom or a substituent in this paragraph), and the method described in JP-A-2009-42351 can be used.

The film of the present invention preferably includes the cage-shaped silosesquioxane compound of 0.1% by mass to 100% by mass, more preferably includes 0.1% by mass to 10% by mass, particularly preferably 0.1% by mass to 5% by mass, and more particularly preferably 1% by mass to 5% by mass with respect to the cyclic olefin. When the content of the cage-shaped silosesquioxane compound is the upper limit value or less of the preferable range, haze can be preferably reduced. When the content of the cage-shaped silosesquioxane compound is the lower limit value or greater of the preferable range, surface hardness of the film can be improved.

Other Additives

In the film of the present invention, additives such as a moisture permeability reduction compound; a stripping accelerator; an Rth control agent (a non-phosphate ester-based compound is included); inorganic particles (matting agent); plasticizers such as a phthalate ester-based compound and a phosphate ester-based compound; an Re expresser; an ultraviolet absorbent; and an antioxidant can also be added as an additive. As the stripping accelerator, the Rth control agent, the inorganic particles, the plasticizer, and the Re expresser, materials described in JP-A-2011-183584 can be used.

As the antioxidant, materials described in JP-A-2010-195953 can be used.

In addition, additives described in WO20/059192 can also be used.

Film Properties

Pencil Hardness

The pencil hardness of the film of the present invention measured by a method equivalent to JIS K 5400 is preferably 5B or harder (which means that when a scratch test is repeated 5 times using a pencil of 5B or harder, the number of times in which scratches do not occur is 3 or more times), more preferably 2B or harder, particularly preferably HB or harder, and more particularly preferably H or harder.

The pencil hardness of the film of the present invention is preferably 3H or harder.

Haze

The haze of the film of the present invention is preferably 3% or less, more preferably 2% or less, particularly preferably 1% or less, more particularly preferably 0.5% or less, and most preferably 0.3% or less.

Film Thickness

The thickness of the film of the present invention, which can be suitably determined, is preferably 20 μm to 100 μm, more preferably 20 μm to 50 μm, and particularly preferably 20 μm to 40 μm. When the thickness of the film is the upper limit value or less of the preferable range, the cost can be preferably reduced. When the thickness of the film is the lower limit value or greater of the preferable range, surface hardness of the film can be improved.

The thickness of the cyclic olefin resin layer, which can be suitably determined, is preferably 20 μm to 100 μm, more preferably 20 μm to 60 μm, and particularly preferably 20 μm to 40 μm from the same viewpoint as the thickness of the film.

The film thickness may be adjusted to become a desired thickness by controlling solid content concentration in a dope or melt, a slit gap of the base of a die, an extrusion pressure from the die, or a speed of a metal support.

Layer Constitution

The film of the present invention comprises a cyclic olefin resin layer including a cyclic olefin resin and a cage-shaped silosesquioxane compound, and may be a monolayer of the cyclic olefin resin layer and may be a laminate of two or more layers including layers other than the cyclic olefin resin layer.

That is, the cyclic olefin resin layer itself may be the film of the present invention, and a layer provided by coating the cyclic olefin resin layer on any substrate may be the film of the present invention.

In a case of the laminate of two or more layers, an aspect having a functional layer such as a hard coat layer as a layer other than the cyclic olefin resin layer and an aspect laminated by coating the cyclic olefin resin layer on a known base film can be exemplified.

The film of the present invention preferably has a functional layer (hereinafter, also referred to as a functional thin film) on at least one surface of the cyclic olefin resin layer, and more preferably has at least a hard coat layer.

Hereinafter, the functional layer used in the present invention will be described.

The film of the present invention can be used in various applications. The film can be used as an optical compensation sheet and a biaxially stretched film. That is, the film of the present invention can be used as an optical film including the film of the present invention, and a polarizer-protecting film including the film of the present invention or the optical film.

In addition, various functional layers can be formed on the film. As the functional layer, an anti-reflection layer, an anti-glare layer, an antistatic layer, a λ/4 layer, and a hard coat layer can be exemplified. It is possible to use as a functional film having a characteristic that hardness of the surface is high by providing a hard coat layer, and it is suitable for use as a film with a high hardness functional layer, having a hard coat layer and a functional layer such as an anti-reflection layer on the upper layer thereof. Moreover, the thickness of the functional layer is different depending on the intended function. For example, the film thickness of the anti-reflection layer is 1 nm to 800 nm, and preferably in a range of 20 nm to several hundreds of nm. The film thickness of the hard coat layer is 1 µm to 100 µm, and preferably 2 µm to 100 µm.

The hard coat layer has a function of imparting scratch resistance to the film of the present invention. The hard coat layer is preferably provided to the film of the present invention.

The hard coat layer includes a crosslinked binder polymer. The hard coat layer including the crosslinked binder polymer can be formed by coating a coating solution including a multifunctional active energy ray-polymerizable compound and a polymerization initiator on a transparent base, and polymerizing the multifunctional active energy ray-polymerizable compound. As the functional group, a polymerizable unsaturated double bond group is preferable. As the polymerizable unsaturated double bond group, an acrylate group, a methacrylate group, and a vinyl group can be exemplified. From the viewpoint of reactivity, the acrylate group is preferable.

In addition, as the hard coat layer used in the present invention, known polymerizable resins can be used, and a thermosetting resin and an active energy ray-polymerizable resin are included therein. Among these, the active energy ray-polymerizable resin is preferable. As the thermosetting resin, reactive resins using a crosslinking reaction of prepolymer of a melamine resin, a urethane resin, or an epoxy resin are exemplified.

As the active energy rays, radiation, gamma rays, alpha rays, electron beam, ultraviolet rays (near ultraviolet rays, mid-ultraviolet rays, far ultraviolet rays, and vacuum ultraviolet rays are included) are exemplified, and among these, ultraviolet rays are preferable.

The multifunctional active energy ray-polymerizable compound is preferably an ester of polyol and acrylic acid or methacrylic acid. Examples of the polyol include ethylene glycol, 1,4-cyclohexane diol, pentaerythritol, trimethylol propane, trimethylol ethane, dipentaerythritol, 1,2,4-cyclohexanetriol, polyurethane polyol, and polyester polyol. Trimethylol propane, pentaerythritol, dipentaerythritol, and polyurethane polyol are preferable. A combination of two or more kinds of the multifunctional active energy ray-polymerizable compounds may be used.

Examples of the active energy ray-polymerizable compound includes active energy ray-polymerizable polyfunctional compounds, in particular ultraviolet ray-polymerizable polyfunctional compounds of pentaerythritol tetra (meth)acrylate, dipentaerythritol hexa(meth)acrylate, and trimethylolpropane tri(meth)acrylate.

The thickness of the hard coat layer can be suitably selected, and is preferably 5 µm to 50 µm, and more preferably 10 µm to 30 µm.

By adding the inorganic particles to the hard coat layer, it is possible to improve a crosslinking shrinkage ratio as a film, improve the flatness of the coating film, and increase the hardness of the coating film. In general, the inorganic particles are harder than organic materials, and do not shrink by UV irradiation. Therefore, by adding the inorganic particles to the hard coat layer, the entire layer becomes hard, scratch resistance is improved, shrinkage of the hard coat layer by a crosslinking reaction is suppressed, and deformation of the film provided with the hard coat layer can also be prevented. However, since the inorganic particles have low affinity with the binder polymer, the bond between the inorganic particles and the binder polymer is easily broken even when added as the inorganic particles, and it is difficult to improve the scratch resistance and the deformation. Therefore, by performing a surface treatment on inorganic particles with the surface treatment agent having high affinity with particles, it is possible to improve the affinity of the inorganic particles and the binder polymer.

As the inorganic particles, inorganic particles having high hardness are preferable, and inorganic particles preferably has Mohs hardness of 6 or higher, and more preferably has 7 or higher. For example, silicon dioxide particles, titanium dioxide particles, zirconium oxide particles, aluminum oxide particles, tin oxide particles, calcium carbonate particles, barium sulfate particles, talc, kaolin, and calcium sulfate particles are included. Among these, silicon dioxide particles, titanium dioxide particles, aluminum oxide, and zirconium oxide particles are particularly preferable.

Method for Manufacturing Film

The film of the present invention, of which the manufacturing method is not limited, can be manufactured using known methods such as a solution film forming method or a melt film forming method, and a film manufactured by the method for manufacturing the film of the present invention described below is preferable.

In the specification, one obtained by melting a composition containing a cyclic olefin resin and a cage-shaped silosesquioxane compound used in a melt cast (also referred to as a melt extrusion) is referred to as melt, and a solution containing a cyclic olefin resin and a cage-shaped silosesquioxane compound used in a solution cast (coating on a translucent support is included) is referred to as a dope.

A first aspect of the method for manufacturing the film of the present invention includes a step of obtaining a melt by melting the composition containing a cyclic olefin resin and a cage-shaped silosesquioxane compound and a step of forming a cyclic olefin resin layer by extruding the melt in a film shape, in which the cage-shaped silosesquioxane compound includes at least one substituent having one or more carbon atoms as a substituent of a Si atom.

A second aspect of the method for manufacturing the film of the present invention includes a step of solution-casting a dope containing a cyclic olefin resin, a cage-shaped silosesquioxane compound, and a solvent on a support, a step of drying the dope after casting, and a step of forming a cyclic olefin resin layer by stripping the dope from the support, in which the cage-shaped silosesquioxane compound includes at least one substituent having one or more carbon atoms as a substituent of a Si atom.

A third aspect of the method for manufacturing the film of the present invention includes a step of coating a dope containing a cyclic olefin resin, a cage-shaped silosesquioxane compound, and a solvent on a translucent support and a step of drying the film after coating, in which the cage-shaped silosesquioxane compound includes at least one substituent having one or more carbon atoms as a substituent of a Si atom.

Even in any aspect of the first aspect, the second aspect, and the third aspect of the method for manufacturing the film of the present invention, a method of adding the cage-shaped silosesquioxane compound to the cyclic olefin resin and the timing are not particularly limited. By forming a film after obtaining a melt by melting a composition containing the cyclic olefin resin and the cage-shaped silosesquioxane compound after simply adding the cage-shaped silosesquioxane compound to the cyclic olefin resin, or preparing a dope containing a cyclic olefin resin, a cage-shaped silosesquioxane compound, and a solvent, a film in which the cage-shaped silosesquioxane compound is considered to be uniformly dispersed is obtained without aggregation of the cage-shaped silosesquioxane compound in both the in-plane direction and the film thickness direction of the cyclic olefin resin layer.

Hereinafter, the first aspect, the second aspect, and the third aspect of the method for manufacturing the film of the present invention will be sequentially described.

(1) First Aspect

In the first aspect of the method for manufacturing the film of the present invention, the film of the present invention is manufactured by a melt film forming method including a step of obtaining a melt by melting the composition containing a cyclic olefin resin and a cage-shaped silosesquioxane compound and a step of forming a cyclic olefin resin layer by extruding the melt in a film shape.

The melt film forming method is a method for forming a film by heating the composition containing a cyclic olefin resin and a cage-shaped silosesquioxane compound at a temperature of the melting point of the cyclic olefin resin (hereinafter, referred to as "Tm") or higher and lower than the thermal decomposition temperature to make a flow condition.

Examples of the melt film forming method include an injection molding method, a calendar molding method, a compression molding method, an inflation molding method, an injection molding method, a blow molding method, and a stretch molding method.

In addition, after forming a film by an injection molding method, a calendar molding method, or an inflation molding method, a stretch molding may be performed.

In the first aspect of the method for manufacturing the film of the present invention, it is preferable to obtain a melt by melting the composition containing a cyclic olefin resin and a cage-shaped silosesquioxane compound.

The step of obtaining a melt by melting the composition containing a cyclic olefin resin and a cage-shaped silosesquioxane compound is not particularly limited, and the method of adding the cage-shaped silosesquioxane compound to the cyclic olefin resin and the timing also are not particularly limited.

Heating and pressure conditions may be suitably selected depending on a molding machine to be used and properties of the cyclic olefin resin and the cage-shaped silosesquioxane compound.

The forming temperature is generally Tm to (Tm+100° C.), and preferably (Tm+20° C.) to (Tm+50° C.).

In the first aspect of the method for manufacturing the film of the present invention, the temperature of the melt in the melting step is preferably 120° C. to 180° C., more preferably 150° C. to 180° C., and particularly preferably 160° C. to 180° C. When the temperature of the melt in the melting step is the lower limit value or higher than the preferable range, the cyclic olefin resin can be preferably sufficiently melted. When the temperature of the melt in the melting step is the upper limit value or lower than the preferable range, deterioration of the cyclic olefin resin and decomposition of the cage-shaped silosesquioxane compound can be preferably suppressed.

The pressure at the time of forming is generally 0.5 Mpa to 100 MPa, and preferably 1 MPa to 50 MPa. The heating time is generally about several seconds to several tens of minutes.

The step of forming the cyclic olefin resin layer by extruding the melt in a film shape is not particularly limited, and known methods can be used.

(2) Second Aspect

In the second aspect of the method for manufacturing the film of the present invention, the film of the present invention is manufactured by a solution film forming (solvent cast method) including a step of solution-casting a dope containing the cyclic olefin resin, the cage-shaped silosesquioxane compound, and a solvent on a support, a step of drying the dope after casting, and a step of forming a cyclic olefin resin layer by stripping the dope from the support. As manufacturing examples of the film using the solvent cast method, each specification of WO02/059192, U.S. Pat. Nos. 2,336,310, 2,367,603, 2,492,078, 2,492,977, 2,492,978, 2,607,704, 2,739,069, and 2,739,070, each specification of UK Patent Nos. 640731 and 736892, and JP-B-45-4554, JP-B-49-5614, JP-A-60-176834, JP-A-60-203430, and JP-A-62-115035 can be referred to. In addition, the film of the present invention is preferably subjected to a stretching treatment, and for a method of the stretching treatment or conditions which are not defined in the present specification, for example, JP-A-62-115035, JP-A-4-152125, JP-A-4-284211, JP-A-4-298310, and JP-A-11-48271 can be referred.

Manufacturing of Dope

In the solvent cast method, a dope (solution) containing the cyclic olefin resin, the cage-shaped silosesquioxane compound, and a solvent is used.

By using such a dope, it is possible to effectively obtain the film of the present invention.

Hereinafter, the dope used in the present invention and each component included in the dope will be described.

In the dope used in the present invention, the amount of the cyclic olefin resin is preferably adjusted such that 10% by mass to 40% by mass is included in the obtained dope. The method of adding the cage-shaped silosesquioxane compound to the cyclic olefin resin and the timing are not particularly limited.

Solvent

Examples of the solvent used in adjusting the dope preferably include aromatic solvents such as benzene, toluene, and xylene, cellosolve-based solvents such as methyl cellosolve, ethyl cellosolve, and 1-methoxy-2-propanol, ketone-based solvents such as diacetone alcohol, acetone, cyclohexanone, methyl ethyl ketone, and 4-methyl-2-pentanone, ester-based solvents such as methyl lactate and ethyl lactate, cycloolefin-based solvents such as cyclopentane, cyclohexane, methyl cyclohexane, cyclohexanone, ethyl cyclohexanone, and 1,2-dimethylcyclohexane, halogen-containing solvents such as 2,2,3,3-tetrafluoro-1-propanol, methylene chloride, chloroform, methyl chloride, carbon tetrachloride, trichloroacetic acid, methyl bromide, methyl iodide, and tri(tetra)chloroethylene, and ether-based solvents such as tetrahydrofuran and dioxane, and any of methylene chloride, toluene, cyclohexane, cyclopentane, and methylcyclohexane is more preferably included.

In the present invention, alcohol is preferably further included in the solvent. Alcohol functions as a poor solvent. In a case of adding alcohol, alcohol having an average carbon number of 1 to 4 is preferably added at a ratio greater than 0% by mass of the entire amount of a solvent and less than or equal to 13% by mass.

The boiling point of the alcohol is preferably 120° C. or lower, and more preferably 40° C. to 100° C. When the boiling point is 120° C. or lower, the drying rate of the solvent can preferably become faster.

Examples of such alcohol having average carbon number of 1 to 4 preferably include alcohols (methanol, ethanol, n-propanol, isopropanol, and n-butanol, and isobutanol). Among these, in the manufacturing method of the present invention, primary alcohols (methanol, ethanol, n-propanol, and n-butanol) are preferably used, and methanol is most preferable from the viewpoint of stripping properties.

In addition, the alcohols may be used in a mixture of two or more kinds thereof as long as the average carbon number of alcohol included in the dope is 1 to 4. Furthermore, an alcohol having 5 carbon atoms may be used as long as the average carbon number is 1 to 4. Specifically, ethanol which are alcohol having 2 carbon atoms, methanol having 1 carbon atom, and a solvent in which ethanol and methanol are mixed at a ratio of 1:1 (mass ratio) or greater can be used. In this case, the average carbon number refers to a value obtained by weighted-averaging the carbon number (for example, if the alcohol is methanol, the carbon number is 1, and if the alcohol is ethanol, the carbon number is 2) of each alcohol included in the dope by the mass ratio of the entire alcohol included in the dope.

The average carbon number of the entire alcohol included in the dope as a solvent is preferably 1 to 4, more preferably 1 to 2.5, and particularly preferably 1 to 2.

In addition, the content of the alcohol having the average carbon number of 1 to 4 included in the dope as a solvent is greater than 0% by mass of the solvent, is preferably 13% by mass or less, more preferably 4% by mass or greater and 10% by mass or less, and particularly preferably 6% by mass or greater and 8% by mass or less. When the content of the alcohol having the average carbon number of 1 to 4 included in the dope as a solvent is greater than 0% by mass, it is possible to improve the stripping properties, when the content is 4% by mass or greater, it is possible to further improve the stripping properties, and when the content is 6% by mass or greater, it is possible to further more improve the stripping properties. When the content of the alcohol having the average carbon number of 1 to 4 included in the dope as a solvent is 13% by mass or less, it is possible to suppress bubble generation and whitening, and when the content is 8% by mass or less, it is possible to further suppress bubble generation due to the alcohol and whitening.

Manufacturing of Dope

In the manufacturing method of the present invention, the dope can be prepared by a general method. The general method means to treat at a temperature of 0° C. or higher (ordinary temperature or high temperature). The preparation of the solution can be performed using a preparation method of a dope and an apparatus in general solvent cast method. The dope can be prepared by stirring the cyclic olefin resin, the cage-shaped silosesquioxane compound, and the solvent at ordinary temperature (0° C. to 40° C.). A high concentration solution may be stirred under heat and pressure conditions. Specifically, the cyclic olefin resin, the cage-shaped silosesquioxane compound, and the solvent are put into a pressurized container and closed, and the mixture is stirred while heating at a temperature of the boiling point or higher of the solvent at ordinary temperature under the pressurization, and at a temperature within the range in which the solvent does not boil. The heating temperature is generally 40° C. or higher, preferably 60° C. to 200° C., and more preferably 80° C. to 110° C.

Respective components may be put into the container (tank, etc.) after being roughly mixed in advance. In addition, respective components may be successively put into the container. The container needs to be constituted such that the content therein can be stirred. It is possible to pressurize the container by injecting an inert gas such as nitrogen gas. In addition, the increase in the vapor pressure of the solvent by heating may be used. Alternatively, after closing the container, respective components may be added under pressure.

In a case of heating, it is preferable to heat from the outside of the container. For example, it is possible to use a jacket type heating apparatus. In addition, it is also possible to heat the entire container by circulating a liquid after providing a plate heater at the outside of the container and laying a pipe.

After providing a stirring blade in the inside of the container, it is preferable to stir using the blade. The length of the stirring blade is preferably a length that the blade reaches the vicinity of the wall of the container. At the end of the stirring blade, a scraping blade is preferably provided to renew the liquid film on the wall of the container.

Measuring instruments such as a pressure gauge and a thermometer may be provided on the container. It is preferable to dissolve respective components into a solvent in the container. The prepared dope is preferably either taken out from the container after being cooled or is cooled using a heat exchanger after being taken out.

The solid content concentration included in the dope is preferably controlled to be 10% by mass to 50% by mass, and more preferably controlled to be 16% by mass to 40% by mass from the viewpoint of the film surface state after being drying.

Film Forming Step

The manufacturing method of the present invention includes a step of solution-casting a dope containing the cyclic olefin resin, the cage-shaped silosesquioxane compound, and a solvent on a support.

Hereinafter, a preferable aspect of the film forming step in the manufacturing method of the present invention will be described.

As the equipment used in the film forming step in the method for manufacturing a film using the cyclic olefin resin, the same solution-cast film forming method and solution-cast film forming apparatus as those applied to manufacturing of a cellulose triacetate film in the related art are used. In the manufacturing method of the present invention, for example, a manufacturing apparatus described in JP-A-2004-359379 can be preferably used.

The cast in the solvent cast method and the drying method described below are described in each specification of U.S. Pat. Nos. 2,336,310, 2,367,603, 2492078, 2492977, 2492978, 2607704, 2739069, and 2739070, UK Patent Nos. 640731 and 736892, and JP-B-45-4554, JP-B-49-5614, JP-A-60-176834, JP-A-60-203430, and JP-A-62-115035.

Furthermore, cellulose acylate film forming technologies described in JP-A-2000-301555, JP-A-2000-301558, JP-A-7-032391, JP-A-3-193316, JP-A-5-086212, JP-A-62-037113, JP-A-2-276607, JP-A-55-014201, JP-A-2-111511, and JP-A-2-208650 can be applied to the present invention.

Hereinafter, more specifically, a preferable aspect of the film forming step will be described.

In cast step, a method of extruding from a die, a method by a doctor blade, or a method by a reverse roll coater is used. Industrially, a method of continuously extruding a dope from a die on a belt shaped or drum shaped support substrate is most general. Examples of the support substrate used include a glass substrate, metal substrates such as stainless and ferrotype, and plastic substrates such as polyethylene terephthalate. It goes without saying that the material of the supporting substrate, and the surface condition thereof significantly affect the stripping properties of the cast film. For example, in the substrate coated with Teflon (registered trademark) having very low surface tension, the stripping properties are excellent. However, industrially, to continuously form a film having excellent surface properties and optical homogeneity, a glass substrate or a metal substrate of which the surface is mirror-finished is most commonly used, and the effect of the present invention is also observed in such a glass substrate and a metal substrate.

As the metal substrate, which is not particularly limited, a known strip-shaped support which moves can be exemplified.

The strip-shaped support which moves is not particularly limited, and a band shape or a belt shape is preferable, and a band shape or a belt shape without an end is more preferable. By using such a support without an end, it is possible to endlessly move a dope. Furthermore, the strip-shaped support may be moved by any aspect, and the strip-shaped support may be moved in any aspect, and an endless belt placed between two or more rolls (drums) is particularly preferable.

In addition, as the material of the strip-shaped support, which is not particularly limited, a metal-made support is preferable, and an SUS-made support (for example, SUS 316) is more preferable.

The specific heat of the strip-shaped support is preferably 0.1 J/(m$^3$·K) to 1.0 J/(m$^3$·K).

The width of the strip-shaped support is preferably 1 m to 3 m, more preferably 1.5 m to 3 m, and particularly preferably about 2 m. Moreover, about 2 m described here refers to a range of 2 m±30 cm.

The length (so-called band length) of the strip-shaped support is preferably 80 m to 100 m.

The surface roughness (Ra value) of the strip-shaped support is preferably 0.01 μm or less. In addition, the surface of the strip-shaped support is preferably mirror-finished. Moreover, the mirror-finishing means that by repeating polishing, the band surface becomes smooth. Furthermore, the band surface is more preferably finished to become a so-called super mirror having a higher thickness precision in the width direction.

The thickness of the strip-shaped support is preferably 1.5 mm to 2 mm.

The dope temperature at the time of casting is 10° C. to 40° C., and preferably in the range of 15° C. to 35° C. To obtain a film having excellent smoothness, it is necessary that the solution extruded from the die be cast and smoothened on the support. At this time, when the cast temperature is too high, drying and solidification of the surface occur before being smoothened, and therefore it is not preferable. In addition, when the temperature is too low, viscosity increases by cooling of a cast solution, smoothness is unlikely to be obtained, condensation occurs, and therefore it is not preferable.

By suppressing drying for a certain period of time and ensuring fluidity of the dope before moving from the cast step to the drying step, it is possible to highly smoothen (leveling effect) the surface of the film.

First Drying Step and Second Drying Step

A first drying step of forming a dope film in which the amount of residual solvent is controlled to 35% by mass to 65% by mass by maintaining a dope after casting at ambient temperature lower than 40° C. and a second drying step of drying the dope film at a drying starting temperature of 40° C. or higher and ambient temperature higher than Tg−70° C. when the amount of residual solvent of the dope film after the first drying step is 35% by mass to 65% by mass (not exceed the amount of the residual solvent after the first drying step) are preferably included. By the first drying step and the second drying step, it is possible to achieve both suppression of whitening of the film and suppression of bubble generation at the same time.

Moreover, the amount of residual solvent is represented by the following formula.

$$\text{The amount of residual solvent (\% by mass)} = \{(M-N)/N\} \times 100$$

Here, M is the mass of the web at any time, and N is the mass when the web of which M is measured is dried at 110° C. for 3 hours.

In drying steps before stripping such as the first drying step and the second drying step, it is necessary to evaporate and remove most of the solvent from the dope which is cast on a support in as a short period of time as possible. However, since when rapid evaporation occurs, deformation by foaming occurs, it is required to carefully select the drying conditions.

In the first drying step, drying may be started at the boiling point of the solvent (preferably methylene chloride) having the lowest boiling point among the solvents used, or preferably, from a range of which the upper limit is −5° C. lower than the boiling point of the solvent (preferably methylene chloride).

In the first drying step, as a method of controlling the amount of residual solvent to 35% by mass to 65% by mass, for example, a method, which is described in JP-B-5-17844, of drying by exposing to the air for 2 seconds or longer after the dope is cast on the support can be exemplified. In addition, a method of maintaining the surface temperature of the support at ambient temperature lower than 40° C. to the start of the second drying step can be exemplified. As the method of maintaining at ambient temperature lower than 40° C., a method of maintaining at ambient temperature of 10° C. to 40° C. is more preferable, and a method of maintaining at ambient temperature of 15° C. to 35° C. is particularly preferable.

In addition, in the first drying step, as a method of controlling the amount of residual solvent at such ambient temperature to 35% by mass to 65% by mass, it is possible to control depending on the drying time in the first drying step.

The amount of residual solvent in the dope film immediately before the second drying step when starting the second drying step is 35% by mass to 65% by mass (not exceed the amount of the residual solvent after the first drying step), more preferably 50% by mass to 65% by mass, and particularly preferably 55% by mass to 65% by mass.

When the amount of residual solvent in the dope film immediately before the second drying step is 35% by mass or greater, whitening is suppressed, and it is preferable from the viewpoint of suppressing bubble generation. When the amount of residual solvent is 50% by mass or greater, whitening is suppressed, and it is more preferable from the viewpoint of further suppressing bubble generation. In addition, when the amount of residual solvent in the dope film immediately before the second drying step is 50% by mass or greater, even in a case of decreasing the film thickness of the film of the present invention to about 20 μm, it is preferable from the viewpoint of being capable of sufficiently suppressing whitening.

On the other hand, when the amount of residual solvent in the dope film immediately before the second drying step is 65% by mass or less, it is preferable from the viewpoint of suppressing whitening.

The second drying step is performed at a drying starting temperature of 40° C. or higher and ambient temperature higher than Tg− (minus, this also applies below) 70° C., 40° C. or higher and Tg−50° C. or higher, and Tg−10° C. or lower is preferable from the viewpoint of suppressing whitening, and 40° C. or higher and Tg−40° C. or higher, and Tg−20° C. or lower is particularly preferable from the viewpoint of suppressing whitening and further suppressing bubble generation.

Stripping Step

The manufacturing method of the present invention includes a step of forming a film by stripping the dope film after the second drying step from the support.

In the manufacturing method of the present invention, it is preferable that after the dope is uniformly cast on the support, the dope film be stripped from the support while controlling specific conditions. In the manufacturing method of the present invention, a region (hereinafter, also referred to as a stripping point) where the dope is stripped is not particularly limited. In this manner, it is preferable that after evaporating the solvent on the support, a half-dried dope film (also called a web) be stripped from the support from the viewpoint of improving the stripping properties.

The amount of residual solvent in the dope film immediately before the stripping step is preferably less than 20% by mass, and more preferably 20% by mass to 10% by mass.

Drying Step after Stripping

The manufacturing method of the film preferably includes a drying step after stripping in which the film is further dried after the stripping step. Moreover, after the drying step after stripping, the film may be used as it is, be subjected to a stretching step by a known method, and be subjected to a winding step by a known method. These steps are described in JP-A-2011-183584.

In the drying step after stripping, the film stripped from the support is further dried, and the amount of residual solvent is preferably 3% by mass or less, more preferably 1% by mass or less, and further more preferably 0.5% by mass or less.

In a case where the support is a strip-shaped support which moves, the web stripped at the stripping position immediately before the strip-shaped support laps one time is transported by a method of transporting alternately to a role group disposed in a zigzag pattern or a method of transporting in a non-contact manner by holding both ends of the web stripped with clips or the like. Drying is performed by a method of blowing air at a predetermined temperature to both sides of the web (film) while being transported or a method of using heating means such as microwave. When drying is rapidly performed, there is a possibility that the flatness of the film formed is impaired, and therefore, it is preferable that in the early stage of drying, drying is performed at a temperature at which the solvent does not foam, and after further drying at the temperature, drying at a high temperature is performed. In the drying step after stripping after stripping from the support, by evaporation of the solvent the film tends to shrink in the longitudinal direction or the width direction. As the temperature of drying increases, the shrinkage increases. It is preferable to dry while suppressing this shrinkage as much as possible for improving the flatness of the completed film. From this point, for example, as shown in JP-A-62-46625, a method (tenter method) of performing the entire steps or a part of steps of drying while width-maintaining both ends of the width of the web with clips or pins in the width direction is preferable. The drying temperature in the drying step is preferably 100° C. to 145° C. Drying temperature, amount of air used for drying, and drying time are different depending on the solvents used, and therefore, the kind of solvent used and the combination may be suitably selected. It is also possible to evaporate the residual solvent by drying with hot air of which temperature is sequentially changed.

(3) Third Aspect

A third aspect of the method for manufacturing the film of the present invention includes a step of coating a dope containing a cyclic olefin resin, a cage-shaped silosesquioxane compound, and a solvent on a translucent support and a step of drying the film after coating, in which the cage-shaped silosesquioxane compound includes at least one substituent having one or more carbon atoms as a substituent of a Si atom.

The third aspect of the method for manufacturing film of the present invention has the following steps (a), (b), and (c) in this order.

(a) A step of providing a coating layer on a optical film material (hereinafter, referred to as a translucent support) such as a cellulose ester resin, an acrylic resin, a PET resin, a polyolefin resin, and a polypropylene resin by coating a first composition containing at least a compound capable of forming a resin by being cured with light and/or heat and a first solvent.

(b) A step of coating a second composition containing at least a cyclic olefin resin, a cage-shaped silosesquioxane compound, and a second solvent on the same surface as the coating layer provided in (a).

(c) A step of forming a resin by curing the compound capable of forming a resin by being cured with light and/or heat, by light-irradiating and/or heating.

Coating Method

Each layer of the film of the present invention can be formed by the following coating method, and this method is not limited.

Known methods such as a dip coating method, an air knife coating method, a curtain coating method, a roller coating method, a wire bar coating method, a gravure coating method, an extrusion coating method (die coating method) (refer to the specification of U.S. Pat. No. 2,681,294), and a micro gravure coating method are used, and among these, the micro gravure coating method and the die coating method are preferable.

Step (a)

Step (a) is a step of providing a coating layer on a translucent support by coating the first composition containing at least a compound capable of forming a resin by being cured with light and/or heat and the first solvent.

The step (a) may be performed plural times by dividing. At this time, the compound capable of forming a resin by being cured with light and/or heat and the solvent used in each time may be the same as or different from each other.

As the first solvent in the step (a), it is possible to use the same solvent as the solvent in (2) the second aspect described above. The first solvent may include only one kind of solvent, or two or more kinds of solvent. At least one kind of the first solvent is preferably a solvent capable of dissolving or swelling the translucent support. A coating material such as a compound capable of forming a resin by being cured with light and/or heat penetrates into the translucent support by using the solvent capable of dissolving or swelling the translucent support, a layer in which a thermoplastic resin constituting the translucent support and the compound capable of forming a resin by being cured with light and/or heat are mixed is likely to be formed, and after the curing step, the translucent support and the resin obtained by curing with light and/or heat exhibit excellent adhesiveness, and therefore, the solvent is preferably used.

Examples of the compound capable of forming a resin by being cured with light and/or heat include polyfunctional monomers and oligomers having two or more epoxy group, oxetanyl group, or ethylenic unsaturated double-bonded group. Examples of the ethylenic unsaturated double-bonded group include polymerizable functional groups such as a (meth)acryloyl group, a vinyl group, a styryl group, and an aryl group, and among these, the (meth)acryloyl group and a —C(=O)OCH=CH$_2$ group are preferable, and the (meth)acryloyl group is more preferable. In addition, when the polyfunctional monomer or the oligomer is a compound having a cyclic olefin group, the adhesiveness thereof with a cyclic olefin resin layer becomes excellent.

The manufacturing method of the translucent support preferably includes a step of forming a polymer film (the above-described translucent support) by casting a polymer solution (dope) including a thermoplastic resin such as a cellulose ester resin, an acrylic resin, a PET resin, a polyolefin resin, a polypropylene resin, a polycarbonate resin, and a polystyrene resin, and a solvent, or a step of forming a translucent support by melt film-forming a thermoplastic resin. That is, the translucent support is preferably formed as a film by casting a polymer solution containing the thermoplastic resin and the solvent, or preferably formed as a film by melt film-forming the thermoplastic resin.

Step (b)

Step (b) is a step of coating a second composition containing at least a cyclic olefin-based resin, a cage-shaped silosesquioxane compound, and a second solvent on the same surface as the coating layer provided in (a).

In a coating method in the step (b), the same method as the coating method in the step (a) can be used. When the coating layer coated in the step (a) is subjected to coating in the step (b) in an uncured state, the die coating method is preferably used since the coating can be performed without coming into contact with the coating film.

As the cyclic olefin-based resin in the second composition in the step (b), it is possible to use the same resin as the cyclic olefin-based resin in the film of the present invention described above.

Even in the second composition in the step (b), the compound capable of forming a resin by being cured with light and/or heat in the optical film of the present invention described above can also be used in combination. By the combination, the adhesiveness of the translucent support and the cyclic olefin-based resin is easily obtained.

As the second solvent in the step (b), it is possible to use the same solvent as the solvent in (2) the second aspect described above. The second solvent may include only one kind of solvent, or two or more kinds of solvent. Among the above-described solvents, the second solvent preferably contains at least one of an alicyclic hydrocarbon-based solvent or an aromatic hydrocarbon-based solvent, and among the second solvents, a solvent of which the main solvent (a solvent of which the content is greater than 50% by mass in the total solvent) is an alicyclic hydrocarbon-based solvent or an aromatic hydrocarbon-based solvent is more preferable from the viewpoint of solubility and versatility of the cyclic olefin-based resin.

Step (c)

Step (c) is a step of forming a resin by curing the compound capable of forming a resin by being cured with light and/or heat, by light-irradiating and/or heating.

Step (c) will be described.

In the present invention, it is possible to select the curing conditions suitable for the curable functional groups of each component used in each coating layer.

Polarizing Plate

A polarizing plate of the present invention includes the polarizer, the film of the present invention, the optical film, or the polarizer-protecting film of the present invention.

The film of the present invention is suitable for a protecting film for a polarizing plate. The polarizing plate is formed by bonding a protecting film on at least one surface of a polarizer to laminate. As the polarizer, polarizers known in the related art can be used, and for example, the polarizer is obtained by treating a hydrophilic polymer film such as a polyvinyl alcohol film with dichroic dyes such as iodine and stretching. The bonding method of the film of the present invention and the polarizer is not particularly limited, and the bonding can be performed by an adhesive formed of an aqueous solution of a water-soluble polymer. As the water-soluble polymer adhesive, a complete saponification type polyvinyl alcohol aqueous solution is preferably used.

The film of the present invention can be preferably used in constitution of the film of the present invention/polarizer/other protecting film for a polarizing plate/liquid crystal cell/other protecting film for a polarizing plate/polarizer/other protecting film for a polarizing plate. In particular, it is preferable that by bonding to a polarizing plate of a liquid crystal display device including liquid crystal cells of a TN type, a VA type, or an OCB type, it be possible to provide a display device which has excellent viewing angle, low coloring, and excellent visibility. In addition, it is preferable that the polarizing plate using the film of the present invention is unlikely to be deteriorated under high temperature and high humidity conditions, and it is possible to maintain stable performance for a long period of time.

An aspect of the polarizing plate includes not only a polarizing plate of an aspect of a film piece which is cut to a size capable of being incorporated directly into a liquid crystal display device but also a polarizing plate of an aspect (for example, an aspect of roll length of 2500 m or greater or 3900 m or greater) which is manufactured in an elongated shape by continuous production, and rolled up in a roll shape. To use in a large-screen liquid crystal display device, as described above, the width of the polarizing plate is preferable 1470 mm or greater.

As the specific constitution of the polarizing plate, which is not particularly limited, known constitutions can be adopted, and for example, it is possible to adopt the constitution described in FIG. 6 of JP-A-2008-262161.

Image Display Device

The image display device of the present invention includes the film of the present invention, the optical film of the present invention, the polarizer-protecting film of the present invention, or the polarizing plate of the present invention.

Examples of the image display device described above can include a liquid crystal display device (liquid crystal display, LCD), a plasma display (PDP), an electroluminescence display (OELD or IELD), a field emission display (FED), a touch panel, and an electronic paper. These image display device is preferably provided with the polarizing plate of the present invention on a display screen side of an image display panel.

Liquid Crystal Display Device

The liquid crystal display device is preferably a liquid crystal display device having a liquid crystal cell and a pair of polarizing plates disposed on both sides of the liquid crystal cell, in which at least one of the polarizing plates is a polarizing plate having the film of the present invention.

As the specific constitution of the liquid crystal display device of the present invention, which is not particularly limited, known constitutions can be adopted. The constitution in FIG. 2 of JP-A-2008-262161 can also be preferably adopted.

EXAMPLES

Hereinafter, the present invention will be described in more detail with reference to examples. The materials, used amounts, ratios, processing contents, processing procedures, and the like indicated in the examples below may be changed as appropriate without departing from the gist of the present invention. Accordingly, the scope of the present invention is not limited to the following specific examples.

Example 1

POSS1 (manufactured by Hybrid Plastics) of the following structure which is a cage-shaped silosesquioxane compound was added to toluene while stirring at 25° C., and TOPAS 5013 (manufactured by Poly Plastics Co., Ltd.) which is a cyclic olefin resin was dissolved such that the added amount of POSS1 becomes 0.1 parts by mass with respect to 100 parts by mass of the cyclic olefin resin while stirring, whereby a transparent dope was obtained (solid content concentration: 40%). The dope was cast on a polyimide substrate using an applicator, and the resultant product was dried at ambient temperature of 25° C. for 1 minute. After drying at 25° C., the resultant product was dried for 10 minutes in a drying zone of 140° C., and dried at 160° C. for 40 minutes, whereby a film (thickness: 40 μm) of the example 1 was obtained.

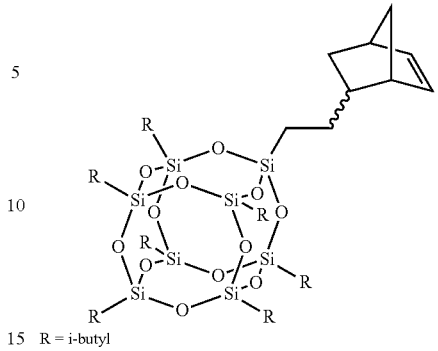

R = i-butyl

Example 2

In the same manner as the example 1 except that the added amount of POSS1 was 1 part by mass with respect to 100 parts by mass of the cyclic olefin resin, a film (thickness: 40 μm) of the example 2 was obtained.

Example 3

In the same manner as the example 1 except that the added amount of POSS1 was 5 parts by mass with respect to 100 parts by mass of the cyclic olefin resin, a film (thickness: 40 μm) of the example 3 was obtained.

Example 4

In the same manner as the example 1 except that the added amount of POSS1 was 10 parts by mass with respect to 100 parts by mass of the cyclic olefin resin, a film (thickness: 40 μm) of the example 4 was obtained.

Example 5

In the same manner as the example 1 except that the added amount of POSS1 was 100 parts by mass with respect to 100 parts by mass of the cyclic olefin resin, a film (thickness: 40 μm) of the example 5 was obtained.

Example 6

A hard coat layer exhibiting a function of an antiglare layer formed by referencing formation of an antiglare layer described in [0112] and [0118] of JP-A-2012-159692 was applied on one side of the film of the example 3, whereby a film (thickness: 45 μm) of the example 6 was obtained.

Example 7

POSS1 was added to cyclohexane while stirring at 25° C., and TOPAS 5013 was dissolved such that the added amount of POSS1 became 5 parts by mass with respect to 100 parts by mass of the cyclic olefin resin while stirring, whereby a transparent dope was obtained (solid content concentration: 10%).

"A triacetyl cellulose film having a layer including a resin cured by light and/or heat on one side" was prepared on a triacetyl cellulose film (thickness: 40 μm) by the following method.

A composition containing 45.5 parts by mass of tricyclodecane dimethanol diacrylate (manufactured by Shin-Nakamura Chemical Co.), 2.5 parts by mass of a photopolymerization initiator IRGACURE907 (manufactured by BASF Corp.), 26 parts by mass of ethyl acetate, and 26 parts by mass of MEK was coated in 15 cm³/m² on the triacetyl cellulose film using a gravure coater, and the resultant product was dried at 25° C. for 1 minute.

Subsequently, the dope was coated such that the film thickness after drying becomes 10 μm under the conditions of a transportation speed of 10 m/min by a die coating method using a slot die described in the example 1 of JP-A-2006-122889, and the resultant product was dried at 120° C. for 5 minutes. Then, ultraviolet rays was irradiated to the coating layer with lighting intensity of 400 mW/cm² and the irradiation amount of 300 mJ/cm² to cure using an air-cooling metal halide lamp (manufactured by Eye Graphics Co., Ltd.) of 160 W/cm at an oxygen concentration of about 0.01% under nitrogen purge, whereby a film (total thickness: 60 μm) of the example 7 was obtained.

Example 8

In the same manner as the example 3 except that POSS2 (manufactured by Hybrid Plastics) of the following structure which is the cage-shaped silosesquioxane compound was used instead of POSS1, a film (thickness: 40 μm) of the example 8 was obtained.

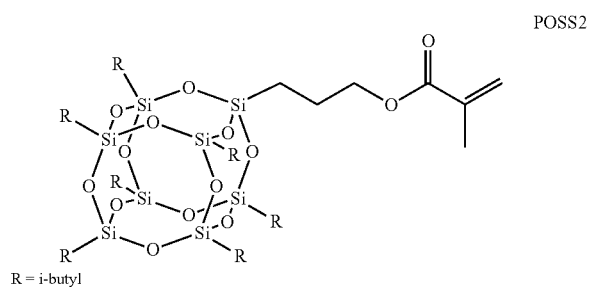

POSS2

R = i-butyl

Example 9

In the same manner as the example 3 except that RX4500 (manufactured by JSR Corporation) was used instead of TOPAS 5013, a film (thickness: 40 μm) of the example 9 was obtained.

Example 10

A melt cast was performed such that the added amount of POSS1 becomes 5 parts by mass with respect to TOPAS 5013 by referencing a method ([0149] to [0151] were referred, and here, a melt (molten resin) temperature measured in a melt extruder was changed to 170° C., and a die lip was changed to 0.2 mm) described in JP-A-2010-195953, and a film (thickness: 40 m) of the example 10 was obtained.

Comparative Example 1

In the same manner as the example 1 except that POSS1 was not added, a film (thickness: 40 μm) of the comparative example 1 was obtained.

Comparative Example 2

In the same manner as the example 3 except that a layer silicate 1 (S-Ben N-400 sold by HOJUN Co., Ltd.) was added instead of POSS1, a film (thickness: 40 μm) of the comparative example 2 was obtained.

Evaluation

Haze:

According to JIS-K7136, the total haze value after the films obtained in each example and comparative example were moisture-controlled under conditions of 25° C. and a relative humidity of 60% for 2 hours was measured. The used apparatus was a haze meter NDH2000 manufactured by Nippon Denshoku Industries Co., Ltd.

The obtained results are shown in the following Table 1.

Pencil Hardness:

After the films obtained in each example and comparative example were moisture-controlled under conditions of 25° C. and a relative humidity of 60% for 2 hours, scratching was repeated with respect to a weight of 500 g (4.9 N) with a pencil for a test of each hardness regulated by JIS S 6006 five times, and the pencil hardness was evaluated by the pencil hardness test according to JIS-K5400.

The obtained results are shown in the following Table 1. In the present invention, pencils in which the number of times (times/5) that scratches did not occur when scratching was repeated five times was three times or more are described in the following Table 1.

Observation Using Optical Microscope

The films obtained in the example 3 and the comparative example 2 were observed with a magnification of 100 times using an optical microscope (trade name: Eclipse LV100-POL, manufactured by Nikon Corporation).

Figure 2:
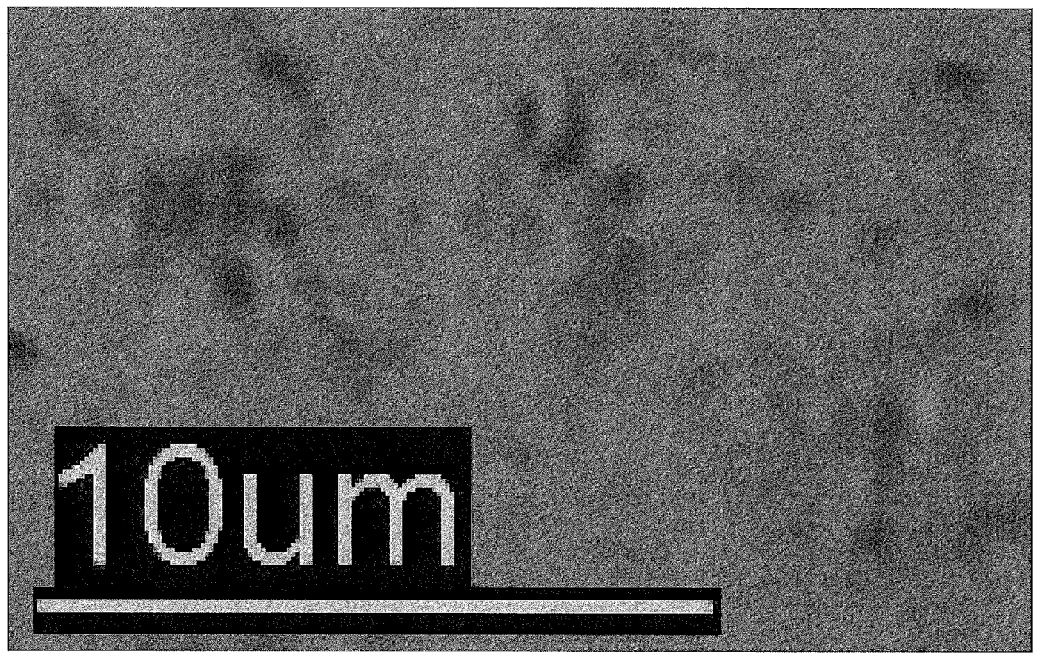
FIG. 2 is a 100 times magnified image of a film in the comparative example 2 using an optical microscope.

100 times magnified images of the films in the example 3 and the comparative example 2 using an optical microscope are shown in FIG. 1 and FIG. 2, respectively.

TABLE 1

| | Film material | | | | Evaluation | |
| --- | --- | --- | --- | --- | --- | --- |
| | | Additive | | | | |
| | Polyolefin resin | Type | Added amount [parts by mass] | Film constitution | Haze [%] | Pencil hardness |
| Example 1 | TOPAS 5013 | POSS1 | 0.1 | Single film of cyclic olefin resin layer | 0.3 | 2B |
| Example 2 | TOPAS 5013 | POSS1 | 1 | Single film of cyclic olefin resin layer | 0.3 | H |
| Example 3 | TOPAS 5013 | POSS1 | 5 | Single film of cyclic olefin resin layer | 0.4 | H |
| Example 4 | TOPAS 5013 | POSS1 | 10 | Single film of cyclic olefin resin layer | 0.5 | H |

TABLE 1-continued

| | Film material | | | | Evaluation | |
| --- | --- | --- | --- | --- | --- | --- |
| | | Additive | | | | |
| | Polyolefin resin | Type | Added amount [parts by mass] | Film constitution | Haze [%] | Pencil hardness |
| Example 5 | TOPAS 5013 | POSS1 | 100 | Single film of cyclic olefin resin layer | 0.8 | 3H |
| Example 6 | TOPAS 5013 | POSS1 | 5 | Single film of cyclic olefin resin layer + hard coat layer type | 0.4 | 3H |
| Example 7 | TOPAS 5013 | POSS1 | 5 | Coating film of cyclic olefin resin layer + base type | 0.3 | HB |
| Example 8 | TOPAS 5013 | POSS2 | 5 | Single film of cyclic olefin resin layer | 0.3 | H |
| Example 9 | RX 4500 | POSS1 | 5 | Single film of cyclic olefin resin layer | 0.3 | HB |
| Example 10 | TOPAS 5013 | POSS1 | 5 | Single film of cyclic olefin resin layer | 0.4 | HB |
| Comparative example 1 | TOPAS 5013 | Nil | 0 | Single film of cyclic olefin resin layer | 0.3 | <6B |
| Comparative example 2 | TOPAS 5013 | layer silicate 1 | 5 | Single film of cyclic olefin resin layer | 3.1 | <6B |

From each example of Table 1 and FIG. 1, it was found that the film of the present invention has a cyclic olefin resin layer with a high water vapor barrier property, low haze, and high surface hardness.

On the other hand, from the comparative example 1 of Table 1, it was found that a film of a single film of the cyclic olefin resin layer in which additives were not added has low surface hardness.

From the comparative example 2 of Table 1 and FIG. 2, it was found that a film of a single film of the cyclic olefin resin layer to which a layer silicate was added has high haze and low surface hardness.

FIG. 1 is a 100 times magnified image of a film in the example 3 using an optical microscope, and it was found that aggregation of additives containing Si atoms, that is, the cage-shaped silosesquioxane compound does not occur and the additives do not adversely affect the haze of the film.

FIG. 2 is a 100 times magnified image of a film in the comparative example using an optical microscope, and it was found that aggregation of additives containing Si atoms, that is, the layer silicate occurs and the additives adversely affect the haze of the film.

Examples 101 to 110, and Comparative Examples 101 and 102

Production of Polarizing Plate

1) Saponification of Film

After commercially available cellulose ester film (Z-TAC, manufactured by Fuji film Corporation) was immersed for two minutes in an aqueous NaOH solution (saponification solution) of 1.5 mol/L which was maintained at 55° C., the film was washed with water, and after the film was immersed for 30 seconds in an aqueous sulfuric acid solution of 0.05 mol/L at 25° C., the film was further washed with running water for 30 seconds, whereby the film became a neutral state. Then, draining was repeated three times by an air knife to remove water, and the film was dried by being kept for 15 seconds in a drying zone at 70° C., whereby a saponified film was produced.

2) Production of Polarizer

According to the example 1 in JP-A-2001-141926, peripheral speed difference between two pairs of nip rolls was provided, and stretching was performed in the longitudinal direction, whereby a polarizer having a thickness of 20 µm was prepared.

3) Bonding

After the polarizer obtained above was sandwiched between one of the films of the examples 1 to 10, and the comparative examples 1 and 2 and a piece of cellulose ester film saponified prepared above, bonding was performed by a roll-to-roll such that the polarizing axis and the longitudinal direction of the film are perpendicular to each other using PVA (PVA-117H, manufactured by KURARAY Co., Ltd.) 3% aqueous solution as an adhesive, whereby a polarizing plate was prepared.

The obtained polarizing plate was used as the polarizing plate in each example and comparative example.

Manufacturing of Liquid Crystal Display Device and Mounting Evaluation

A polarizing plate sandwiching a liquid crystal cell was stripped from a commercially available liquid crystal television (slim 42-inch LCD TV of an IPS mode), and the polarizing plate prepared above was rebonded on both sides of the liquid crystal cell through an adhesive agent such that a hard coat layer of the film of the present invention is disposed on the opposite side of the liquid crystal cell. The rebuilt liquid crystal television was used as the image display device in each example and comparative example.

The obtained display performance of the image display device in each example and comparative example was confirmed, and when confirming brightness and color when viewed from the front and the oblique direction, in the liquid crystal display device in each example using the film of the present invention, a neutral black display could be realized in both the front direction and the viewing angle direction. In addition, black display unevenness after being left in a high temperature and high humidity environment was small, and excellent display performance was obtained.

While the present invention has been described in detail and with reference to specific embodiments thereof, it will be apparent to one skilled in the art that various changes and modifications can be made therein without departing from the spirit and scope thereof.

The present disclosure relates to the subject matter contained in Japanese Patent Application No. 2013-144599, filed on Jul. 10, 2013, the contents of which are expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. An optical film, comprising: a cyclic olefin resin layer including a cyclic olefin resin and a cage-shaped silosesquioxane compound, wherein the cage-shaped silosesquioxane compound does not include a cyclic olefin based resin and includes at least one substituent having one or more carbon atoms as a substituent of a Si atom, and the cyclic olefin resin layer comprising the cage-shaped silosesquioxane compound of 0.1 parts by mass to 100 parts by mass relative to the cyclic olefin of 100 parts by mass.

2. The optical film according to claim 1, wherein the cage-shaped silosesquioxane compound has at least one polymerizable reactive group.

3. The optical film according to claim 1, wherein the cage-shaped silosesquioxane compound has a structure represented by the following formula (1):

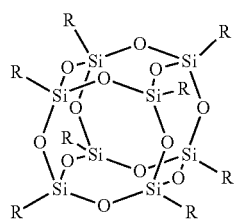

Formula (1)

wherein each R independently represents a hydrogen atom or a substituent, and at least one R represents a substituent having one or more carbon atoms.

4. The optical film according to claim 3, wherein each R in the formula (1) independently represents a substituent having one or more carbon atoms.

5. The optical film according to claim 3, wherein R in the formula (1) includes an alkyl group, an alkenyl group, an alkynyl group, an aryl group, or a siloxy group, and these groups may further have an alkyl group, an alkenyl group, an alkynyl group, an aryl group, a halogen atom, or a polymerizable reactive group as a substituent.

6. The optical film according to claim 1, wherein 1 to 3 polymerizable reactive groups which are independent from each other and 5 to 7 groups selected independently from alkyl group, alkenyl group, alkynyl group, aryl group, or a siloxy group in which these groups may further have an alkyl group, an alkenyl group, an alkynyl group, an aryl group, a halogen atom, or a polymerizable reactive group as a substituent exist as R in the formula (1).

7. The optical film according to claim 1, comprising a hard coat layer on at least one surface of the cyclic olefin resin layer.

8. The optical film according to claim 1, having a pencil hardness measured by a method equivalent to JIS K 5400 of 2B or harder.

9. The optical film according to claim 1, having a haze of 3% or less.

10. The optical film according to claim 1, having a thickness of 20 μm to 100 μm.

11. A method for manufacturing an optical film, comprising: obtaining a melt by melting a composition containing a cyclic olefin resin and a cage-shaped silosesquioxane compound; and forming a cyclic olefin resin layer by extruding the melt in a film shape, wherein the cage-shaped silosesquioxane compound does not include a cyclic olefin based resin and includes at least one substituent having one or more carbon atoms as a substituent of a Si atom, and the cyclic olefin resin layer comprising the cage-shaped silosesquioxane compound of 0.1 parts by mass to 100 parts by mass relative to the cyclic olefin of 100 parts by mass.

12. The method for manufacturing the optical film according to claim 11, wherein a temperature of the melt in the melting step is 120° C. to 180° C.

13. A method for manufacturing an optical film, comprising: solution-casting a dope containing a cyclic olefin resin, a cage-shaped silosesquioxane compound, and a solvent on a support; drying the dope after casting; and forming a cyclic olefin resin layer by stripping the dope from the support, wherein the cage-shaped silosesquioxane compound does not include a cyclic olefin based resin and includes at least one substituent having one or more carbon atoms as a substituent of a Si atom, and the cyclic olefin resin layer comprising the cage-shaped silosesquioxane compound of 0.1 parts by mass to 100 parts by mass relative to the cyclic olefin of 100 parts by mass.

14. An optical film manufactured by obtaining a melt by melting a composition containing a cyclic olefin resin and a cage-shaped silosesquioxane compound; and forming a cyclic olefin resin layer by extruding the melt in a film shape, wherein the cage-shaped silosesquioxane compound does not include a cyclic olefin based resin and includes at least one substituent having one or more carbon atoms as a substituent of a Si atom, and the cyclic olefin resin layer comprising the cage-shaped silosesquioxane compound of 0.1 parts by mass to 100 parts by mass relative to the cyclic olefin of 100 parts by mass.

15. A polarizer-protecting film comprising an optical film which comprises a cyclic olefin resin layer including a cyclic olefin resin and a cage-shaped silosesquioxane compound, wherein the cage-shaped silosesquioxane compound does not include a cyclic olefin based resin and includes at least one substituent having one or more carbon atoms as a substituent of a Si atom, and the cyclic olefin resin layer comprising the cage-shaped silosesquioxane compound of 0.1 parts by mass to 100 parts by mass relative to the cyclic olefin of 100 parts by mass.

16. A polarizing plate comprising a polarizer and an optical film which comprises a cyclic olefin resin layer including a cyclic olefin resin and a cage-shaped silosesquioxane compound, wherein the cage-shaped silosesquioxane compound does not include a cyclic olefin based resin and includes at least one substituent having one or more carbon atoms as a substituent of a Si atom, and the cyclic olefin resin layer comprising the cage-shaped silosesquioxane compound of 0.1 parts by mass to 100 parts by mass relative to the cyclic olefin of 100 parts by mass.

17. An image display device comprising an optical film which comprises a cyclic olefin resin layer including a cyclic olefin resin and a cage-shaped silosesquioxane compound, wherein the cage-shaped silosesquioxane compound does not include a cyclic olefin based resin and includes at least one substituent having one or more carbon atoms as a substituent of a Si atom, and the cyclic olefin resin layer comprising the cage-shaped silosesquioxane compound of 0.1 parts by mass to 100 parts by mass relative to the cyclic olefin of 100 parts by mass.

\* \* \* \* \*